US012109883B1

(12) United States Patent
Wires

(10) Patent No.: US 12,109,883 B1
(45) Date of Patent: Oct. 8, 2024

(54) ELECTRIC DELIVERY TRUCK CONTROL SYSTEM FOR HUB MOTOR CONTROL

(71) Applicant: Workhorse Group Inc., Sharonville, OH (US)

(72) Inventor: Donald L. Wires, Loveland, OH (US)

(73) Assignee: Workhorse Group Inc., Sharonville, OH (US)

( * ) Notice: Subject to any disclaimer, the term of this patent is extended or adjusted under 35 U.S.C. 154(b) by 0 days.

(21) Appl. No.: 18/238,838

(22) Filed: Aug. 28, 2023

(51) Int. Cl.
*B60K 23/08* (2006.01)
*B60K 7/00* (2006.01)
(Continued)

(52) U.S. Cl.
CPC ........ *B60K 23/0808* (2013.01); *B60K 7/0007* (2013.01); *B60K 17/356* (2013.01); *B60L 7/10* (2013.01); *B60L 15/2045* (2013.01); *B60L 58/12* (2019.02); *B60K 2023/085* (2013.01); *B60L 2200/36* (2013.01); *B60L 2240/14* (2013.01); *B60L 2240/423* (2013.01);
(Continued)

(58) Field of Classification Search
CPC .............. B60K 23/0808; B60K 7/0007; B60K 17/356; B60K 2023/085; B60L 7/10; B60L 15/2045; B60L 58/12; B60L 2200/36; B60L 2240/14; B60L 2240/423; B60L 2240/465; B60L 2240/549; B60L 2240/64; B60L 2240/642; B60L 2250/28; B60L 2260/28
See application file for complete search history.

(56) References Cited

U.S. PATENT DOCUMENTS

2009/0118882 A1   5/2009   Heap et al.
2019/0126759 A1*  5/2019   Miller ................. B60L 15/2009
(Continued)

FOREIGN PATENT DOCUMENTS

CN      116572756 A  *  8/2023
KR    20080036778 A  *  4/2008

OTHER PUBLICATIONS

English translation of Wang (CN-116572756) (Year: 2023).*
(Continued)

*Primary Examiner* — James M McPherson
*Assistant Examiner* — Kyle J Kingsland
(74) *Attorney, Agent, or Firm* — Taft Stettinius & Hollister LLP

(57) ABSTRACT

An electric delivery truck control system is disclosed. Sensors detect hub motor parameters associated with the hub motors. An electric delivery truck control unit detects electric delivery truck control inputs associated with an operation of the electric delivery truck. The electric delivery truck control inputs are generated from an operation of the electric delivery truck. An operation parameter controller automatically adjusts a torque level applied by each hub motor of the electric delivery truck to be within a hub motor operation threshold based on the hub motor parameters thereby enabling each hub motor to operate at an operation torque level as requested from the operation of the electric delivery truck. The operation parameter controller maintains the torque level applied by each hub motor within a current limit allowed by a battery management unit of the electric delivery truck and a torque limit allowed by each hub motor.

18 Claims, 4 Drawing Sheets

(51) Int. Cl.
  *B60K 17/356* (2006.01)
  *B60L 7/10* (2006.01)
  *B60L 15/20* (2006.01)
  *B60L 58/12* (2019.01)

(52) U.S. Cl.
  CPC ... *B60L 2240/465* (2013.01); *B60L 2240/549* (2013.01); *B60L 2240/64* (2013.01); *B60L 2240/642* (2013.01); *B60L 2250/28* (2013.01); *B60L 2260/28* (2013.01)

(56) References Cited

U.S. PATENT DOCUMENTS

| | | |
|---|---|---|
| 2019/0160938 A1 | 5/2019 | Hart |
| 2021/0094405 A1 | 4/2021 | Payne et al. |
| 2021/0213952 A1 | 7/2021 | Willison et al. |
| 2022/0410720 A1* | 12/2022 | Tessaro ............... B60L 15/2009 |
| 2023/0182558 A1 | 6/2023 | Willison et al. |

OTHER PUBLICATIONS

International Search Report; International Searching Authority; International Application No. PCT/US2023/037139; Feb. 20, 2024; 2 pages.

Written Opinion of the International Searching Authority; International Searching Authority; International Application No. PCT/US2023/037139; Feb. 20, 2024; 8 pages.

Sun et al. "Driving-cycle-oriented design optimization of a permanent magnet hub motor drive system for a four-wheel-drive electric vehicle." IEEE Transactions on Transportation Electrification 6.3 (2020): 1115-1125. Retrieved on Dec. 28, 2023 (Dec. 28, 2023) from <https://opus.cloud1.lib.uts.edu.au/bitstream/10453/144867/2/Paper.pdf>.

* cited by examiner

ELECTRIC DELIVERY TRUCK CONTROL SYSTEM FOR HUB MOTOR CONTROL

BACKGROUND

Field of Disclosure

The present disclosure generally relates to electric delivery trucks and specifically to an electric control system for hub motor control of the hub motors of the electric delivery truck.

Related Art

Conventional electric vehicles that operate on roadways include a conventional electric motor and conventional brakes in which the conventional electric motor is instructed to drive the front wheels and the rear wheels and the conventional brakes are instructed to brake the front wheels and rear wheels of the electric delivery truck based on the requests of the driver without any intervention. The amount of braking and acceleration applied to each of the front wheels and rear wheels is uniform and also varies in a uniform manner based on the acceleration and braking as controlled by the driver pressing the acceleration pedal or brake pedal. The driver presses the accelerator whenever the driver requests to accelerate and presses on the brake pedal whenever the driver requests to brake without any concern as to the status of each wheel relative to the roadway.

However, the conditions in the operation of the conventional electric vehicle are constantly changing and such changing conditions may impact each of the wheels of the conventional electric vehicle in a different manner at any instant as the driver operates the conventional electric vehicle. The driver is often unaware that different acceleration and/or braking should be applied to each of the wheels individually in order to assist the operation of the conventional electric vehicle. Further, simply the positioning of the acceleration pedal and brake pedal by the driver is unable to customize the acceleration and/or braking applied to each of the wheels but rather provides uniform acceleration and/or braking to all of the wheels.

Any type of adjustment executed by the driver with regard to how the driver operates the conventional electric vehicle as the driver maneuvers the electric vehicle along the roadway is simply conventionally executed by the natural intelligence of the driver as well as limited to the position of the acceleration pedal and brake pedal. The driver simply presses on the acceleration pedal and/or brake pedal to adjust the acceleration and/or braking applied to each of the wheels in a uniform manner based on how the driver interprets the current operation of the conventional electric vehicle relative to the intent of the driver. For example, the driver may request to accelerate up a hill but the driver has no concern as well as no ability to adjust the acceleration based on the acceleration pedal to apply more an increased torque level to the rear wheels as compared to the front wheels assist the conventional electric vehicle in climbing the hill. Thus, individual torque levels are not applied to each of the front wheels and rear wheels on an individual basis and thereby individually adjusted based on each wheel relative to the current conditions of the operation of the conventional electric vehicle.

BRIEF DESCRIPTION OF THE DRAWINGS/FIGURES

Embodiments of the present disclosure are described with reference to the accompanying drawings. In the drawings, like reference numerals indicate identical or functionally similar elements. Additionally, the left most digit(s) of a reference number typically identifies the drawing in which the reference number first appears.

Figure 3:
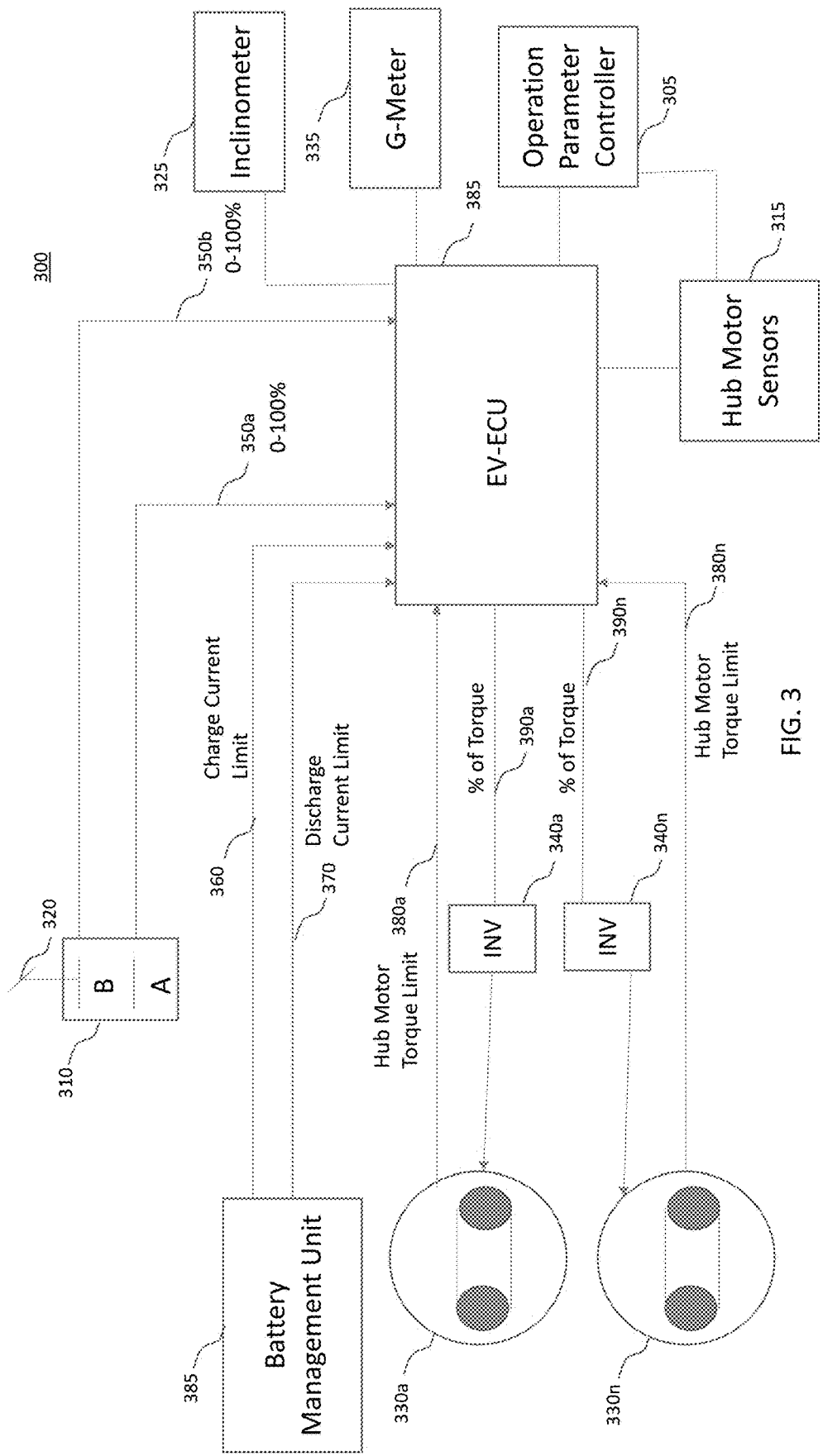
FIG. 3 illustrates a block diagram of an electric delivery truck control system that automatically maintains the operation of the electric delivery truck within the operation threshold to ensure that the power consumed by the electric delivery truck is maintained within the overall power storage of the electric delivery truck.
Figure 4:
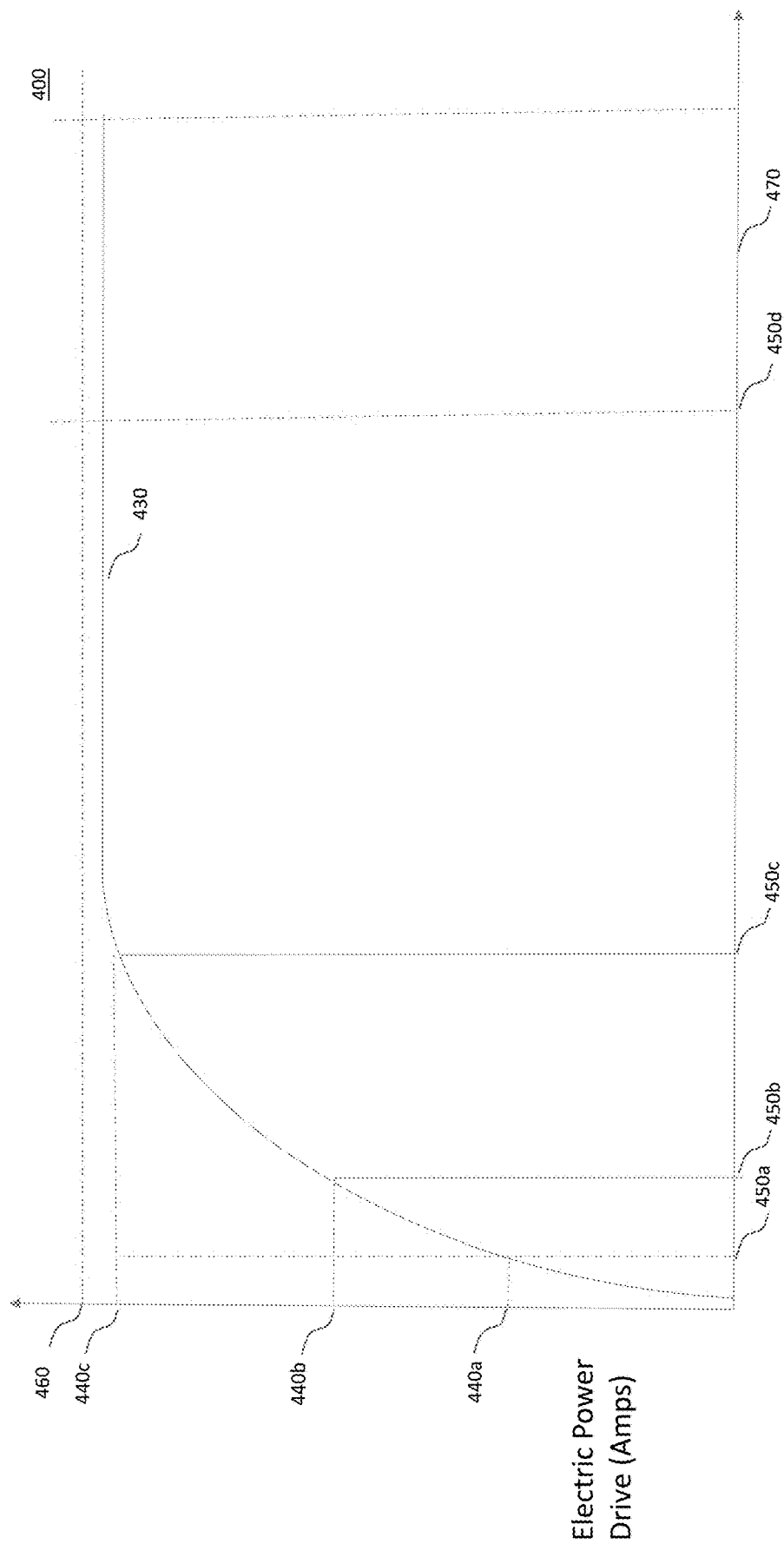

FIG. 3 illustrates a block diagram of an electric delivery truck hub motor control system that automatically maintains the operation of the electric delivery truck within the hub motor operation threshold to ensure that the torque level applied by each hub motor satisfies the electric delivery truck control inputs as well as the hub motor parameters while maintaining the torque level within the torque limit of each hub motor and the current within the current limit of the battery management unit 385 of the electric delivery truck; and FIG. 4 illustrates an electric delivery truck hub motor configuration that may monitor the hub motor parameters and the operation torque level to determine when an increase in the operation torque level of the electric delivery truck is requested by the driver as generated by the execution of the delivery route as the electric delivery truck executes the delivery route based on step torque level.

DETAILED DESCRIPTION OF THE PRESENT DISCLOSURE

The following Detailed Description refers to accompanying drawings to illustrate exemplary embodiments consistent with the present disclosure. References in the Detailed Description to "one exemplary embodiment," an "exemplary embodiment," an "example exemplary embodiment," etc., indicate the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic may be described in connection with an exemplary embodiment, it is within the knowledge of those skilled in the art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the present disclosure. Therefore, the Detailed Description is not meant to limit the present disclosure. Rather, the scope of the present disclosure is defined only in accordance with the following claims and their equivalents.

Embodiments of the present disclosure may be implemented in hardware, firmware, software, or any combination thereof. Embodiments of the present disclosure may also be implemented as instructions applied by a machine-readable medium, which may be read and executed by one or more processors. A machine-readable medium may include any mechanism for storing or transmitting information in a form readable by a machine (e.g., a computing device). For example, a machine-readable medium may include read only memory ("ROM"), random access memory ("RAM"), magnetic disk storage media, optical storage media, flash memory devices, electrical optical, acoustical or other forms of propagated signals (e.g., carrier waves, infrared signals, digital signals, etc.), and others. Further firmware, software routines, and instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, each of the various components discussed may be considered a module, and the term "module" shall be understood to include at least one software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently from any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the present disclosure that others can, by applying knowledge of those skilled in the relevant art(s), readily modify and/or adapt for various applications such exemplary embodiments, without undue experimentation, without departing from the spirit and scope of the present disclosure. Therefore, such adaptations and modifications are intended to be within the meaning and plurality of equivalents of the exemplary embodiments based upon the teaching and guidance presented herein. It is to be understood that the phraseology or terminology herein for the purpose of description and not of limitation, such that the terminology or phraseology of the present specification is to be interpreted by those skilled in the relevant art(s) in light of the teachings herein.

SYSTEM OVERVIEW

Figure 1:
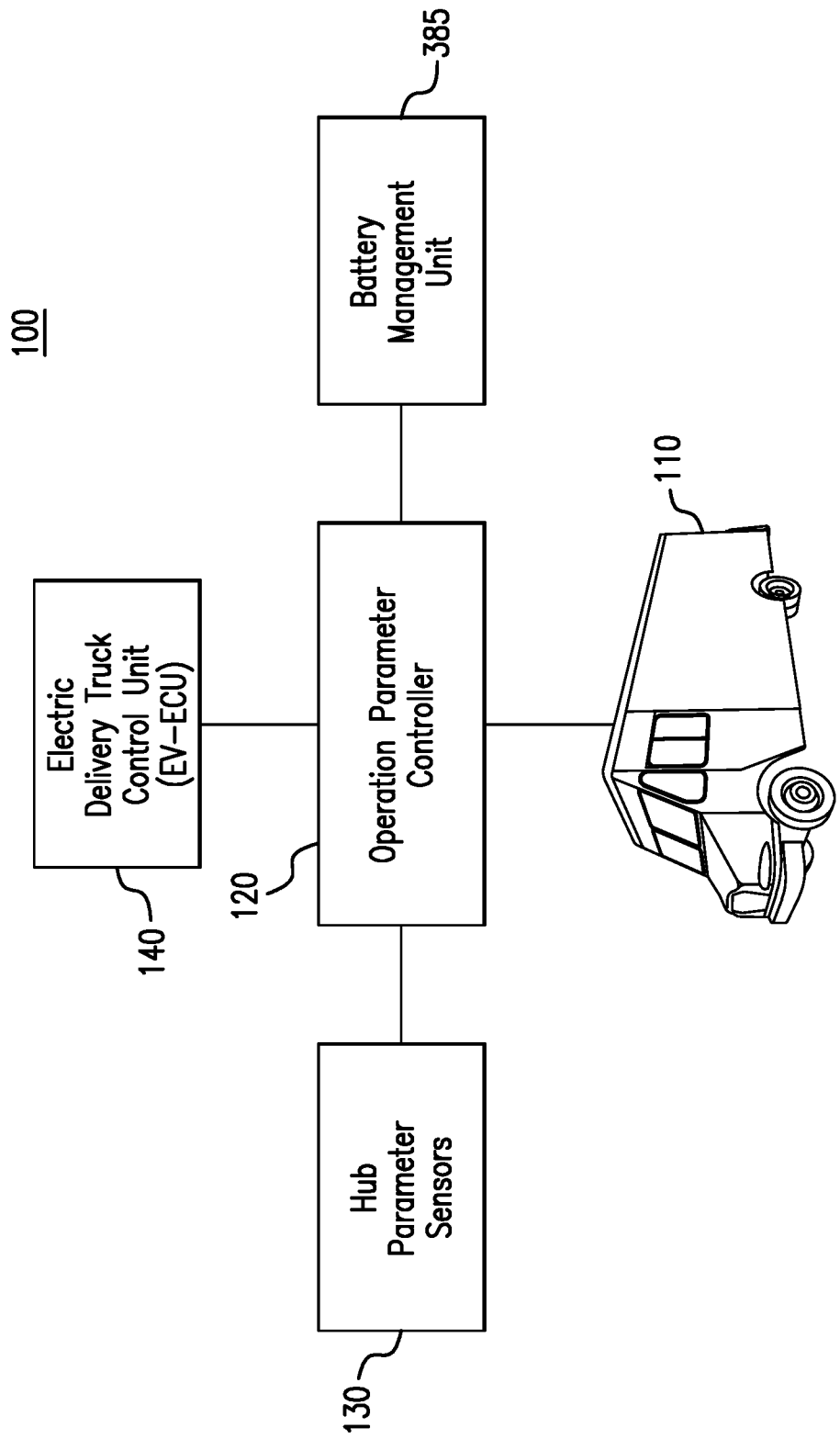
FIG. 1 illustrates a block diagram of an electric delivery truck control system that may automatically adjust the torque level applied by each of the hub motors that drive each of the corresponding wheels of the electric delivery truck as the electric delivery truck operates on a roadway.

FIG. 1 illustrates a block diagram of an electric delivery truck control system that may automatically adjust the torque level applied by each of the hub motors that drive each of the corresponding wheels of the electric delivery truck 110 as the electric delivery truck 110 operates on a roadway. An electric delivery truck hub motor control configuration 100 includes an electric delivery truck 110 that may maneuver along a roadway. The electric delivery truck 110 is a motorized truck with wheels that is powered by electric power that is stored in the overall power storage of the electric delivery truck 110 and maneuvers along the roadway that is positioned on the ground such that the wheels maintain contact with the roadway as the wheels rotate from the propulsion of a motor and the electric delivery truck 110 then maneuvers along roadway via the rotation of the wheels. For example, the electric delivery truck 110 may include but is not limited to electric trucks with Gross Vehicle Weight Ratings (GVWR) in class 3, class 4, class 5 and/or any other electric trucks included in any other GVWR classifications that will be apparent to those skilled in the relevant art(s) without departing from the spirit and scope of the disclosure.

An operation parameter controller 120 may automatically adjust the torque level applied by each of the hub motors that drive each of the corresponding wheels of the electric delivery truck 110 as the electric delivery truck 110 maneuvers along the roadway. Rather than the driver simply being able to operate the electric delivery truck 110 as the driver desires such as with abrupt accelerations and/or abrupt brakings, the operation parameter controller 120 may automatically adjust the operation of the electric delivery truck 110 such that the operation parameter controller 120 automatically adjusts the torque level applied by each of the hub motors to each of the corresponding wheels of the electric delivery truck 110. In doing so, the operation parameter controller 120 automatically adjusts the torque level applied by each hub motor such that each hub motor drives each corresponding wheel within the current limit of the battery management unit 385 and the torque limit of each corresponding hub motor while responding to the current conditions of the electric delivery truck 110 as the electric delivery truck operates 110.

As the operation of the electric delivery truck 110 dynamically changes, the operation parameter controller 120 may automatically adjust the torque level applied by each hub motor to each corresponding wheel in response to the dynamically changing operation of the electric delivery truck 110 to ensure that the electric delivery truck 110 maneuvers along the roadway with increased performance as well as an increase in the efficiency of power consumption. The overall power storage of the electric delivery truck 110 is the electric power that is generated and/or stored on board the electric delivery truck 110 as the electric delivery truck 110 operates in a power storage device, such as an electric battery storage pack. As the electric delivery truck 110 operates, the electric delivery truck 110 consumes and/or generates electric power that is stored in the overall power storage. The operation parameter controller 120 may then ensure that the operation of the electric delivery truck 110 when executing the route is in reaction to the current conditions of the operation of the electric delivery truck 110 while maintaining the consumption of the electric power consumed to the electric power stored in the overall power storage device.

The operation parameter controller 120 may automatically adjust the operation of the electric delivery truck 110 based on a plurality of hub parameter sensors 130 that detect a plurality of hub motor parameters that are indicative to the operation of the hub motors of the electric delivery truck 110 and may change dynamically as the electric delivery truck 110 maneuvers along the roadway. As the hub motor parameters detected by the hub parameter sensors 130 change, the operation parameter controller 120 may automatically adjust the torque level applied by each of the hub motors as the electric delivery truck 110 operates to accommodate the dynamic change in the hub motor parameters to maintain the operation of the electric delivery truck 110 within the torque limit of each hub motor and the current limit allowed by the electric battery storage pack.

In doing so, enabling the electric delivery truck 110 to execute the route by consuming power stored in the overall power storage of the electric delivery truck 110 as well as increasing performance of the electric delivery truck 110 as the electric delivery truck 110 operates. For example, the electric delivery truck 110 when executing a route may transfer from operating on a relatively flat surface to descending a hill. In doing so, the operation parameter controller 120 may automatically adjust the torque level applied by the hub motors associated with the front wheels to be increased and the torque level applied to the hub motors associated with the rear wheels to be decreased. As a result, the electric delivery truck 110 is driven down the hill with an increase torque level applied by the hub motors associated with the front wheels while assisting in preventing potential over acceleration of the electric delivery truck as the electric delivery truck descends the hill by applying a decrease in torque level by the hub motors associated with the rear wheels. The consumption of electric power consumed is also maintained to the electric power stored in the overall power storage device.

The operation parameter controller 120 may also automatically adjust the operation of the electric delivery truck 110 based on a plurality of electric delivery truck control inputs that are generated from an operation of the electric delivery truck 110 and may change dynamically as the driver operates the electric delivery truck 110 along the roadway. The electric delivery truck control inputs may be detected by an electric delivery truck control unit (EV-ECU) 140. As the driver of the electric delivery truck 110 adjusts the operation of the electric delivery truck 110, the operation parameter controller 120 may automatically adjust the torque level applied by each hub motor such that each hub motor drives each corresponding wheel within the current limit of the battery management unit 385 and the torque limit of each corresponding hub motor while responding to the current conditions of the electric delivery truck 110 as the electric delivery truck 110 operates. Further, the operation parameter controller 120 may also adjust the torque level applied by each hub motor to ensure that the power consumed by the electric delivery truck 110 when executing the route is maintained with the overall power storage of the electric delivery truck 110.

The operation parameter controller 120 may automatically adjust the operation of the electric delivery truck 110 as the electric delivery truck 110 maneuvers along the roadway to maintain the operation of the electric delivery truck 110 within a hub motor operation threshold based on the detected hub motor parameters and electric delivery truck control inputs. The hub motor operation threshold is the operation of the electric delivery truck 110 based on the hub motor parameters in which the torque level applied by each hub motor as requested by the electric delivery truck inputs from the operation of the electric delivery truck 110 is maintained within a current limit allowed by a battery management unit 385 of the electric delivery truck 110 and a torque limit allowed by each hub motor as the electric delivery truck 110 executes a route.

The operation parameter controller 120 may automatically adjust the torque level applied by each hub motor as the electric delivery truck 110 maneuvers along the roadway to maintain the operation of the electric delivery truck 110 within the hub motor operation threshold for each of the hub motors of the electric delivery truck 110 while still executing the maneuvering of the electric delivery truck 110 along the roadway. As the electric delivery truck 110 maneuvers along the roadway, the geometry of the roadway may change. The geometry of the roadway are the dimensions, curvature, and/or grade of the roadway. For example, the geometry of the roadway includes but is not limited to the width of the roadway, the quantity of lanes of the roadway, the width of each lane of the roadway, the grade of the roadway, the curvatures of the roadway, and/or any other type of geometry of the roadway will be apparent to those skilled in the relevant art(s) without departing from the spirit and scope of the disclosure.

Figure 2:
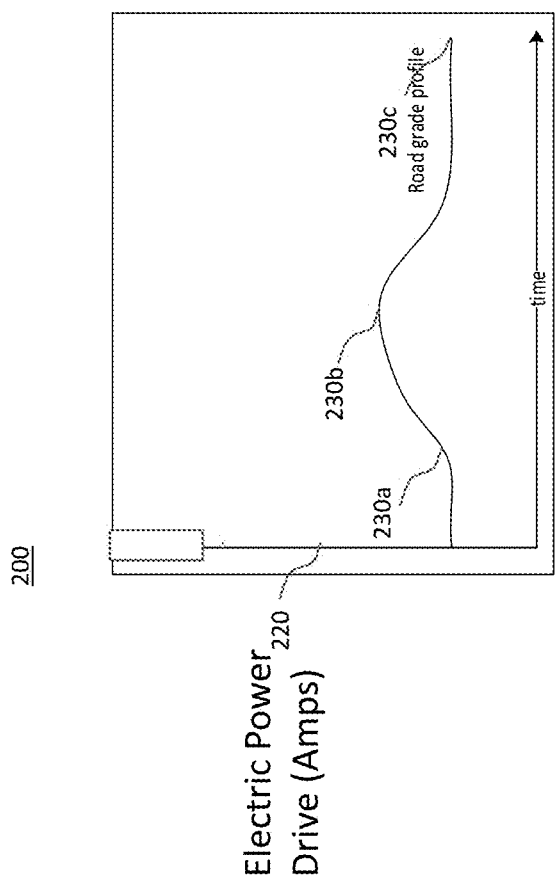
FIG. 2 illustrates a roadway segment configuration that depicts the geometry of the roadway changes as the grade of the roadway changes.

As the geometry of the roadway changes, the operation of the electric delivery truck 110 in order to adapt to the change of the geometry of the roadway also changes. For example, as shown in a roadway segment configuration 200 as depicted in FIG. 2, the geometry of the roadway changes as the grade 230($a$-$c$) of the roadway changes. In such an example, the operating speed of the electric delivery truck 110 may significantly decrease as the driver of the electric delivery truck 110 attempts to transition from the flat grade 230$a$ and to climb to the top grade 230$b$ thereby requiring an increase in the electric power drive (A) 220 to increase the torque level applied to each of the wheels to drive the electric delivery truck 110 to climb to the top grade 230$b$. The operating speed of the electric delivery truck 110 may then significantly increase as the electric delivery truck 110 transitions from the top grade 230$b$ to the flat grade 230$c$ thereby requiring a decrease in the electric power drive (A) 220 to decrease the torque level applied to each of the wheels to maintain the operating speed of the electric delivery truck 110 as the electric delivery truck 110 descends from the top grade 230$b$. The operating speed and the electric power drive (A) to maintain the torque level applied to each wheel may then level out as the electric delivery truck 110 maneuvers along the flat grade 230$c$.

As the operation of the electric delivery truck 110 changes in order to adapt to the change of the geometry of the roadway, the torque level applied by each of the hub motors to drive the electric delivery truck 110 as generated by the electric power drive 220 provided from the overall power storage also changes. The torque level applied by each of the hub motors to drive the electric delivery truck 110 to encounter the change of grade 230($a$-$c$) in FIG. 2 is different from the torque level applied by each of the hub motors as generated by the electric power drive 220 to drive the electric delivery truck 110 for each change in grade. For example, the torque level applied by the hub motors to drive the corresponding wheels may steadily increase in driving the electric delivery truck 110 as the electric delivery truck 110 transitions from the flat grade 230$a$ to the top grade 230$b$ in order to compensate for the decrease in operating speed of the electric delivery truck 110 as the electric delivery truck 110 transitions from the flat grade 230$a$ to the top grade 230$b$. The torque level applied by the hub motors to drive the corresponding wheels may then steadily decrease in order to compensate for the increase in operating speed of the electric delivery truck 110 as the electric delivery truck 110 transitions from the top grade 230$b$ to the flat grade 230$c$.

As noted above, the operation parameter controller 120 may automatically adjust a torque level applied by each hub motor to each corresponding wheel of the electric delivery truck 110 to automatically adjust the operation of the electric delivery truck 110 as the electric delivery truck maneuvers along the roadway to maintain the torque level applied by each hub motor within a hub motor operation threshold. The hub motor operation threshold is the operation of the electric delivery truck 110 that maintains the torque level applied by each of the hub motors to operate at an operation torque level as requested by the electric delivery truck control inputs from the operation of the electric delivery truck. In doing so, the torque level applied by each hub motor is maintained within a current limit allowed by the battery management unit 385 and a torque limit allowed by each hub motor while still enabling the electric delivery truck 110 to execute the route. Rather than simply applying a uniform torque level to each of the wheels of the electric delivery truck 110 based on the positioning of the acceleration pedal and brake pedal by the driver, the operation parameter controller 120 may automatically adjust the torque level applied by each hub motor to each wheel based on the current operation of the electric delivery truck 110 while maintaining the level within the current limit allowed by the battery management unit 385 and the torque limit allowed by each hub motor to enable the electric delivery truck 110 execute the route.

The adjustment to the acceleration and/or braking of the electric delivery truck 110 has conventionally been implemented by the natural intelligence of the driver. However, any type of adjustment due to the natural intelligence of the driver obviously is limited to the natural intelligence of the driver but also any type of adjustment due to the natural intelligence of the driver is done by the perception of the driver as well as the limitation of the positioning of the accelerator pedal and the brake pedal. For example, a driver with a higher level of natural intelligence may recognize that continuing to press on the accelerator pedal to maintain the operating speed when climbing a steep incline may actually have a negative impact on the performance of the electric delivery truck 110 climbing the steep incline with such a steep increase in the uniform acceleration applied to each of the wheels. However, such a driver may decrease the amount of pressure on the accelerator pedal simply by the what the driver perceives as the appropriate amount of pressure to put on the accelerator pedal. Such a perception as well as the actual positioning of the accelerator pedal may not appropriately adjust the torque level applied by the hub motors to the front wheels relative to the torque level applied by the hub motors to the rear wheels to adequately drive the electric delivery truck 110 up the steep incline.

The natural intelligence of the driver as well as the limitation in the positioning of the acceleration pedal and brake pedal provides uniform adjustment to the acceleration and/or braking of each of the wheels simply based on the positioning of the acceleration pedal and brake pedal. Such a uniform adjustment to the acceleration and braking of each wheel in which each wheel is accelerated and/or braked in a substantially similar manner is limited based on the positioning of the acceleration pedal and brake pedal and does not allow the automatic adjustment of the torque level applied by each hub motor to each wheel as well as different torque levels applied by each hub motor to each wheel relative to each other as the electric delivery truck operates 110. Thus, the operation parameter controller 120 may significantly increase the performance of the electric delivery truck 110 as the electric delivery truck 110 maneuvers along the roadway as well as decrease the electric power consumption of the electric delivery truck 110 by continuously adjusting the torque level applied by each hub motor to each wheel as the electric delivery truck 110 operates.

The operation parameter controller 120 may be a device that is capable of electronically communicating with other devices. Examples of the operation parameter controller 120 may include a mobile telephone, a smartphone, a workstation, a portable computing device, other computing devices such as a laptop, or a desktop computer, cluster of computers, set-top box, and/or any other suitable electronic device that will be apparent to those skilled in the relevant art(s) without departing from the spirit and scope of the disclosure.

In an embodiment, multiple modules may be implemented on the same computing device. Such a computing device may include software, firmware, hardware or a combination thereof. Software may include one or more applications on an operating system. Hardware can include, but is not limited to, a processor, a memory, and/or graphical user interface display.

Sensor Detection Configuration

FIG. 3 illustrates a block diagram of an electric delivery truck hub motor control system that automatically maintains the operation of the electric delivery truck 110 within the hub motor operation threshold to ensure that the torque level applied by each hub motor 330(a-n), where n is an integer greater than or equal to two, satisfies the electric delivery truck control inputs as well as the hub motor parameters while maintaining the torque level within the torque limit of each hub motor and the current within the current limit of the battery management unit 385 of the electric delivery truck 110. An electric delivery truck hub motor control system configuration 300 includes a plurality of hub motor sensors 315(a-n), where n is an integer equal to or greater that one, that are associated with the electric delivery truck 110. The hub motor sensors 315(a-n) include but are not limited to a imaging device, a global positioning system (GPS), a control area network (CAN) bus, brake/acceleration voltage sensors, accelerometer, load sensor, inclinometer, velocity sensor, wheel slip sensors, wheel acceleration sensors, wheel position sensors, wheel velocity sensors, steering wheel position sensor, G-meters, charge current sensor, discharge current sensor, temperature sensor, MPGe sensor, and/or any other type of hub motor sensor 315(a-n) that is indicative to the operation electric delivery truck 110 and the generation of torque level by each hub motor 330(a-n) that will be apparent to those skilled in the relevant art(s) without departing from the spirit and scope of the disclosure. The hub motor sensors 315 may also specifically include an inclinometer 325 and a G-meter 335.

The hub motor sensors 315(a-n) detect hub motor parameters associated with the hub motors 330(a-n) as generated by the electric delivery truck 110 as the electric delivery truck 110 operates. The operation parameter controller 305 may then incorporate the hub motor parameters into the automatic adjustment of torque level applied by each of the hub motors 330(a-n) as the electric delivery truck 110 operates. In doing so, the operation parameter controller 305 may adjust the hub motors 330(a-n) of the electric delivery truck 110. The electric delivery truck hub motor control configuration 300 shares many similar features with the electric delivery truck hub motor control configuration 100; therefore, only the differences between the electric delivery truck hub motor control configuration 300 and the electric delivery truck hub motor control configuration 100 are to be discussed in further detail.

A plurality of hub motor sensors 315(a-n), such as but not limited to an imaging device, a global positioning system (GPS), a control area network (CAN) bus, brake/acceleration voltage sensors, accelerometer, load sensor, inclinometer, velocity sensor, wheel slip sensors, wheel acceleration sensors, wheel position sensors, wheel velocity sensors, steering wheel position sensor, G-Meter, charge current sensor, discharge current sensor, temperature sensor, MPGe sensor, and so on, are associated with the electric delivery truck 110 that maneuvers along the roadway. The hub motor sensors 315(a-n) detect a plurality of hub motor parameters associated with the electric delivery truck 110 as the electric delivery truck 110 maneuvers along the roadway. The hub motor parameters are indicative to an operating environment that the electric delivery truck 110 is operating. The hub motor parameters provide insight to the operation parameter controller 120 as to the how the electric delivery truck 110 is currently operating such that the operation parameter controller 305 may then incorporate the hub motor parameters into the automatic adjustment of the torque level applied by each hub motor 330(*a-n*) to each corresponding wheel to account for the current operation of the electric delivery truck 110 as the electric delivery truck 110 maneuvers along the roadway.

For example, the hub motor parameters provide insight as to the current operation of the electric delivery truck 110 such as but not limited to the acceleration of the electric delivery truck 110, load of the electric delivery truck 110, braking, wheel velocity, velocity of the electric delivery truck 110, incline and/or decline, location, environment, acceleration of each wheel, slip of each wheel, deceleration of each wheel, steering wheel position, G-force, charge current, discharge current, temperature, and so on. The hub motor parameters may also provide insight as to the current terrain that the electric delivery truck 110 is operating such as the grade of the roadway, the map of the roadway, and so on. The hub motor parameters may also provide insight as to the electric power consumption of the electric delivery truck 110 such as but not limited to the current voltage of the drive battery, acceleration relative to amount of Amps being drawn to support the speed of the electric delivery truck 110, state of charge of the drive battery, the temperature of the drive battery, electric power efficiency of the electric delivery truck 110 in Miles per Gallon Gasoline Equivalent (MPGe), and so on.

The hub motor parameters may include but are not limited to acceleration, deceleration, electric delivery truck speed, wheel speed, position of the electric delivery truck, maps, roadway grade, YAW, cabin air temperature, cabin air pressure, voltage of the drive battery, motor acceleration relative to amount of Amps being drawn, state of charge of the drive battery, the temperature of the drive battery, MPGe, acceleration of the electric delivery truck 110, braking, wheel velocity, velocity of the electric delivery truck 110, incline and/or decline, load, location, environment, acceleration of each wheel, slip of each wheel, deceleration of each wheel, steering wheel position, G-force, charge current, discharge current, temperature, and/or any other type of hub motor parameter that is indicative to the operation electric delivery truck 110 that will be apparent to those skilled in the relevant art(s) without departing from the spirit and scope of the disclosure.

An electric delivery truck control unit (EV-ECU) 385 that is associated with the electric delivery truck 110 may detect a plurality of electric delivery truck control inputs generated from the operation of the electric delivery truck 110 as the electric delivery truck 110 maneuvers along the roadway. The electric delivery truck control inputs are inputs that represent the intent of the driver with regard to the operation of the electric delivery truck 110. For example, a pedal 320 may be pressed by the driver in order to indicate the intent of the driver to accelerate and/or brake the electric delivery truck 110 as the electric delivery truck 110 operates. The positon of the pedal 320 may generate a corresponding voltage 310 in which that voltage 310 represents the amount in which the driver requests to accelerate and/or brake the electric delivery truck 110. The electric delivery truck control inputs may include any kind of input that represents the intent of the driver with regard to the operation of the electric delivery truck 110 that will be apparent to those skilled in the relevant art(s) without departing from the spirit and scope of the disclosure.

The operation parameter controller 305 may then automatically adjust the torque level applied by each hub motor 330(*a-n*) of the electric delivery truck 110 to be within a hub motor operation threshold based on the hub motor parameters thereby enabling each hub motor 330(*a-n*) to operate at an operation torque level as requested by the electric delivery truck control inputs from the operation of the electric delivery truck 110. The operation parameter controller 305 may also automatically adjust the torque level applied by each hub motor 330(*a-n*) to maintain the torque level applied by each hub motor 330(*a-n*) within a current limit allowed by a battery management unit 385 of the electric delivery truck 110 and a torque limit allowed by each torque motor 330(*a-n*) as the electric delivery truck 110 executes a route.

Each of the numerous hub motor parameters detected by the hub motor sensors 315(*a-n*) may enable the operation parameter controller 305 to automatically adjust the torque level applied by each hub motor 330(*a-n*) as the electric delivery truck 110 operates to accommodate each of the numerous hub motor parameters that may be impacting the operation of the electric delivery truck 110. Rather than simply having the electric delivery truck 110 operate with a uniform acceleration and/or braking applied to each of the wheels to accelerate and/or brake the electric delivery truck 110, the operation parameter controller 305 may identify each hub motor parameter and the corresponding impact of that hub motor parameter on the operation of the electric delivery truck 110 and then automatically adjust the torque level applied by each hub motor 330(*a-n*) to each corresponding wheel based on the operation of the electric delivery truck 110. The hub motors 330(*a-n*) are each hub motor that is associated to apply a torque level to drive a corresponding wheel that when each torque level applied by each hub motor 330(*a-n*) is adjusted trigger the electric delivery truck 110 to operate accordingly.

For example, conventionally, a uniform acceleration and/or braking is applied to each wheel based on the driver pressing the acceleration pedal and/or brake pedal. In doing so, a substantially similar acceleration level is applied uniformly to each wheel driven by the electric motor and a substantially similar braking level is applied uniformly to each wheel by each brake associated with each wheel. However, the operation parameter controller 305 may automatically adjust the torque level applied by each hub motor 330(*a-n*) to each corresponding wheel to be customized to each wheel based on the hub motor parameters generated as the electric delivery truck 110 operates. Rather than simply applying a uniform acceleration and/or braking to each wheel, the operation parameter controller 305 may monitor the hub motor parameters as detected by the hub motor sensors in real-time and thereby automatically adjust the torque level applied by each hub motor 330(*a-n*) to each corresponding wheel to be customized to respond to the hub motor parameters as monitored by the operation parameter controller 305. In doing so, the operation parameter controller 305 may automatically adjust each torque level applied by each hub motor 330(*a-n*) to each corresponding wheel to accommodate the current condition of each corresponding wheel relative to the electric delivery control inputs generated by the driver.

For example, the driver may have the intent to accelerate the electric delivery truck 110 quickly to climb a steep incline based on the acceleration pedal 320 of the electric delivery truck 110. In doing so, the operation parameter controller 305 may automatically adjust the torque level applied by each of the hub motors 330(*a-n*) to each of the corresponding wheels to drive each of the corresponding wheels at an acceleration requested by the driver based on the position of the acceleration pedal 320 as the driver maneuvers the electric delivery truck 110 to climb the steep incline based on the inclinometer 325. However, the driver requests to accelerate the electric delivery truck 110 at an increased velocity to climb the steep incline at an acceleration that is increased to a point that two wheels are going to slip due to the increased acceleration relative to the steep incline and the current load of the electric delivery truck 110 based on the inclinometer 325.

Rather than allow the two wheels to slip based on the electric delivery truck control input of the increased acceleration by the driver based on the position of the acceleration pedal 320, the operation parameter controller 305 may monitor in real-time the acceleration of each wheel, the incline, the load of the electric delivery truck 110 and so on as detected by the hub motor sensors 315(*a-n*) and automatically adjust the torque level applied by the two hub motors 330(*a-n*) that correspond to the two wheels that are going to slip to prevent the wheels from slipping. In doing so, the torque level applied by the two hub motors 330(*a-n*) to the two wheels that were going to slip may differ from the torque level applied by the two hub motors 330(*a-n*) to the two wheels that had sufficient traction may differ to increase the performance of the electric delivery truck 110 while climbing the steep incline while still reacting to the electric delivery truck control input provided by the driver.

The operation parameter controller 305 may also automatically adjust the torque level applied by each hub motor 330(*a-n*) to be within a hub motor operation threshold. The hub motor operation threshold is the threshold that maintains each torque level applied by each hub motor 330(*a-n*) to be within the current limit allowed by the battery management unit 385 as well as within the torque limit allowed by each hub motor 330(*a-n*). As the electric delivery truck operates 110, the current limit allowed by the battery management unit 385 for each hub motor 330(*a-n*) to apply the torque level to each corresponding wheel may continuously change based on the amount of current available in the battery management unit 385 as well as the electric delivery truck control inputs generated by the driver as well as the hub motor parameters generated by the operation of the electric delivery truck 110. As a result, operation parameter controller 110 may continuously adjust the torque level applied by each hub motor 330(*a-n*) to limit each torque level to not exceed the current limit of the battery management unit 385.

Further, as the electric delivery truck operates 110, the torque limit allowed by each corresponding hub motor 330(*a-n*) for each hub motor 330(*a-n*) to apply the torque level to each corresponding wheel may continuously change based on the amount of torque available in each corresponding hub motor 330(*a-n*) as well as the electric delivery truck control inputs generated by the driver as well as the hub motor parameters generated by the operation of the electric delivery truck 110. As a result, operation parameter controller 305 may continuously adjust the torque level applied by each hub motor 330(*a-n*) to limit each torque level to not exceed the torque limit of each corresponding hub motor 330(*a-n*).

Real-time is the continuous monitoring of the hub motor parameters as detected by the hub motor sensors 315(*a-n*) and the automatic adjustment of the torque level applied by each hub motor 330(*a-n*) in reaction to the hub motor parameters as the hub motor parameter parameters continuously change during the operation of the electric delivery truck 110. Real-time is also the periodic monitoring of the hub motor parameters as detected by the hub motor sensors 315(*a-n*) and the automatic adjust of the torque level applied by each hub motor 330(*a-n*) in reaction to the periodic monitoring of the hub motor parameters as detected by the hub motor sensors 315(*a-n*).

The electric delivery truck 110 may include four individual hub motors 330(*a-n*) with each hub motor associated with each corresponding wheel. The electric delivery truck 110 may include two hub motors 330(*a-n*) in which each of the two hub motors is associated with the front wheels. The electric delivery truck 110 may also include two hub motors 330(*a-n*) in which each of the two hub motors is associated with the rear wheels. The quantity of hub motors 330(*a-n*) in which the operation parameter controller 305 automatically adjusts the torque level applied by each hub motor 330(*a-n*) may be any quantity of hub motors 330(*a-n*) and a combination corresponding to any combination of wheels that will be apparent to those skilled in the relevant art(s) without departing from the spirit and scope of the disclosure.

Electric Delivery Truck Hub Motor Monitoring Configuration

As discussed above, the operation parameter controller 305 may automatically adjust the torque level applied by each of the hub motors 330(*a-n*) based on the hub motor parameters monitored by the hub motor sensors 315. In doing so, the operation parameter controller 305 may automatically adjust the torque level applied by each of the hub motors 330(*a-n*) independently in real-time in response to the hub motor parameters to increase performance of the electric delivery truck 110 as the electric delivery truck 110 operates without the intervention of the driver. As a result, the control of each wheel is customized by the operation parameter controller 305 based on the automatic adjustment of the torque level applied by each hub motor 330(*a-n*) to each wheel as the electric delivery truck 110 operates.

Rather than have the driver adjust the pressure applied to the accelerator and/or brake pedal based on the driver's perception of the operation status of each wheel as the electric delivery truck 110 operates, the operation parameter controller 305 may anticipate the operation of each wheel based on the hub motor parameters and then automatically adjust the torque level applied to each wheel to counteract any negative impact to the wheel as the electric delivery truck 110 operates. The independent control of the torque level applied by each hub motor 330(*a-n*) to each wheel as the electric delivery truck 110 operates by the operation parameter controller 305 enables the operation parameter controller 305 to customize the operation of each wheel as the electric delivery truck 110 operates to enhance the operation of the electric delivery truck 110 in response to any hub motor parameter that changes and/or deviates as the electric delivery truck 110 operates. As a result, the operation parameter controller 305 is able to maintain the operation of the electric delivery truck 110 that is safe and controlled while satisfying the operation requests of the driver as well as maintaining the operation of the electric delivery truck 110 within the current limit of the battery management unit 385 as the electric delivery truck 110 maneuvers along the roadway.

For example, operation parameter controller 305 may anticipate that the electric delivery truck 110 is entering a curve based on the position of the accelerator and brake pedal as applied by the driver, the acceleration of the electric delivery truck 110, the speed of the electric delivery truck 110, the G-force of each wheel of the electric delivery truck 110, wheel speed, wheel position, steering wheel position, the grip of each wheel, and the slip of each wheel. In anticipation of the electric delivery truck 110 entering the curve, the operation parameter controller 305 may independently adjust the torque level applied by each hub motor 330(*a-n*) to each of the corresponding wheels to ensure the electric delivery truck 110 maneuvers through the curve safely while still satisfying the operation requests of the driver. The electric delivery truck 110 may anticipate a decrease in grip and an increase in slip of the outer wheels compared to the inner wheels based on the hub motor parameters monitored by the hub motor sensors 315 and the knowledge that the electric delivery truck 110 is maneuvering through a curve. The electric delivery truck 110 may automatically adjust the torque level applied by the hub motors 330(*a-n*) associated with the outer wheels to decrease while increasing the torque level applied by the hub motors applied to the inner wheels as the electric delivery truck maneuvers through the curve. In doing so, the operation parameter controller 305 may prevent the electric delivery truck 110 from flipping as the electric delivery truck 110 maneuvers through the curve.

In another example, the operation parameter controller 305 may anticipate that the driver requests that the electric delivery truck execute a 360-degree turn based on the position of the accelerator and brake pedal and the steering wheel position provided by the driver as well the G-force monitored by the G-Meter 335 and the acceleration monitored by the accelerometer. In anticipation of the electric delivery truck 110 entering the 360-degree turn, the operation parameter controller may independently adjust the torque level applied by each hub motor 330(*a-n*) to each of the corresponding wheels to ensure the electric delivery truck 110 maneuvers through the 360-degree turn safely while still satisfying the operation requests of the driver. The electric delivery truck 110 may anticipate a decrease in grip and an increase in slip of the outer wheels compared to the inner wheels based on the hub motor parameters monitored by the G-Meter 335 and the accelerometer as well as the other hub motor sensors 315 and the knowledge that the electric delivery truck 110 is maneuvering through a 360 degree turn. The electric delivery truck 110 may automatically adjust the torque level applied by the hub motors 330(*a-n*) associated with the outer wheels to decrease while increasing the torque level applied by the hub motors applied to the inner wheels as the electric delivery truck maneuvers through the 360 degree turn. In doing so, the operation parameter controller 305 may prevent the electric delivery truck 110 from flipping as the electric delivery truck 110 maneuvers through the 360 degree turn.

Conventionally, as the driver increases the pressure applied to the accelerator pedal, the amount of torque driven by the motor and uniformly applied to each wheel uniformly increases. As the driver decreases the pressure applied to the accelerator pedal, the amount of torque driven by the motor and uniformly applied to each wheel uniformly decreases. Conventionally, each wheel is associated with a brake in which the driver applies the brake pedal which then corresponds to the amount of braking applied to each corresponding wheel. As the driver increases the pressure applied to the brake pedal, the amount of torque applied to each wheel uniformly decreases due to each brake. As the driver decreases the pressure applied to the brake pedal, the amount of torque applied to each wheel uniformly increases due to each brake.

However, each hub motor included in the electric delivery truck 110 enables the torque level to be applied in reverse to be as much torque level applied in drive as the electric delivery truck 110 proceeds forward. In doing so, each hub motor 330(*a-n*) that corresponds to each wheel enables wheels to be driven forward at the same time the remaining wheels are driven in reverse. As a result, conventional brakes in order to uniformly apply braking to each wheel is not needed as the operation parameter controller 305 may independently adjust the torque level applied by each hub motor 330(*a-n*) to each corresponding wheel such that the independent adjustment of torque level enables the electric delivery truck 110 to adequately accelerate and brake without the need of conventional brakes.

In doing so, the operation parameter controller 305 enables the electric delivery truck 110 to operate with increased stability. As the electric delivery truck 110 maneuvers along the roadway, the operation parameter controller 305 may automatically adjust the torque level applied by each hub motor 330(*a-n*) independently to each wheel based on the hub motor parameters for increased stability to the electric delivery truck 110. The automatic adjustment of torque level and the independent applying of torque level to each wheel by each corresponding hub motor 330(*a-n*) increases the stability of the electric delivery truck 110 as the electric delivery truck 110 maneuvers along the roadway. As a result, the amount of torque applied in reverse is as much as the electric delivery truck 110 moves forward such that the operation parameter controller 305 has full control of the torque level applied by each hub motor 330(*a-n*) to each wheel in which the independent torque level applied may be modulated as a function of G-force, acceleration, and/or any other hub motor parameter that is modifiable over 100% torque level forward and 100% torque level backward that will be apparent to those skilled in the relevant art(s) without departing from the spirit and scope of the disclosure.

That enables the operation parameter controller 305 to control the operation of the electric delivery truck 110 fully with increased stability as the torque level applied by each hub motor 330(*a-n*) in reverse equals the amount of torque level applied by each hub motor 330(*a-n*) in moving forward. The application of the torque level applied by each hub motor 330(*a-n*) in each direction enables the electric delivery truck 110 to be moved to a stop position as the electric delivery truck 110 maneuvers along the roadway thereby enabling full control of the electric delivery truck 110 by the operation parameter controller 305 as compared to the conventional brakes associated with each conventional wheel.

The operation parameter controller 305 may monitor the numerous operation parameters as detected by the numerous hub motor sensors 315 as well as the numerous hub motor parameters that are provided via the CAN bus of the electric delivery truck 110. The operation parameter controller 305 may access the CAN bus and thereby monitor the numerous hub motor parameters provided via the CAN bus. In doing so, as the hub motor parameters are generated and/or adjusted during the operation of the electric delivery truck 110, the operation parameter controller 305 may monitor the hub motor parameters in real-time. Real-time is the monitoring of hub motor parameters as the hub motor parameters are generated during the current state of the electric delivery truck 110. Real-time is also the monitoring of hub motor parameters that are updated during periodic time intervals and provided to the operation parameter controller 305 after each time interval is concluded.

The operation parameter controller 305 may determine a percentage of maximum torque 390(*a-n*), where n is an integer equal to the quantity of hub motors 330(*a-n*), applied by each hub motor 330(*a-n*) as the electric delivery truck 110 executes the route to be within the hub motor operation threshold based on the hub motor parameters and the operation torque level as requested by the electric delivery truck control inputs that is maintained within the current limit allowed by the battery management unit 385 and the torque limit allowed by each hub motor 330(a-n). The percentage of maximum torque 390(a-n) maintains the torque level applied by each hub motor 330(a-n) within a percentage of the current limit allowed by the battery management unit 385 and the torque limit 380(a-n), where n is in an integer that is equal to the quantity of hub motors 330(a-n), allowed by each hub motor 330(a-n) and satisfies the requested operation torque level. The operation parameter controller 305 may automatically adjust the torque level applied by each hub motor 330(a-n) of the electric delivery truck 110 to be at the percentage of maximum torque 390(a-n) determined to satisfy the requested operation torque level and maintain the torque level with in the percentage of current limit allowed by the battery management unit 385 and the torque limit 380(a-n) allowed by each hub motor 330(a-n).

For example, the hub motor parameters provide insight as to the current operation of the electric delivery truck 110 such as but not limited to the acceleration of the electric delivery truck 110, load of the electric delivery truck 110, braking, wheel velocity, velocity of the electric delivery truck 110, incline and/or decline, location, environment, acceleration of each wheel, slip of each wheel, deceleration of each wheel, steering wheel position, G-force, charge current, discharge current, temperature, and so on. The hub motor parameters may also provide insight as to the current terrain that the electric delivery truck 110 is operating such as the grade of the roadway, the map of the roadway, and so on. The hub motor parameters may also provide insight as to the electric power consumption of the electric delivery truck 110 such as but not limited to the current voltage of the drive battery, acceleration relative to amount of Amps being drawn to support the speed of the electric delivery truck 110, state of charge of the drive battery, the temperature of the drive battery, electric power efficiency of the electric delivery truck 110 in Miles per Gallon Gasoline Equivalent (MPGe), and so on.

In doing so, the accelerator/brake pedal 320 provides the driver command to the EV-ECU 385 based on a percentage of 0-100% of acceleration and/or deceleration of the operation torque level that the driver is requesting from the electric delivery truck 110. With regard to the driver requesting to accelerate, the driver may generate the first analog voltage 350a and the second analog voltage 350b that corresponds to the position of the accelerator pedal 320 in which the position of the accelerator pedal 320 corresponds to a voltage level that is then converted to a percentage of 0-100% that depicts the operation torque level that the driver is requesting to accelerate. Based on the percentage of 0-100% of acceleration that is depicted by the first analog voltage 350a and the second analog voltage 350b, the battery management unit 385 provides the discharge current limit 370 to the EV-ECU 385. The discharge current limit 370 is the hub motor parameter that provides the amount of current that is available to be discharged by the electric battery storage pack as the electric delivery truck 110 operates.

As the electric delivery truck 110 operates, the amount of current that is available to be discharged by the electric battery storage pack may vary as the electric delivery truck 110 operates based on hub motor parameters such as temperature, level of electric power available in the electric battery storage pack and so on. The operation parameter controller 305 may determine the discharge current limit 370 available from the electric battery storage pack relative to the first analog voltage 350a and the second analog voltage 350b that represents the request of the driver as to the amount of operation torque level that the driver would like the electric delivery truck 110 to accelerate. As the discharge current limit 370 available from the electric battery storage pack varies as the electric delivery truck 110 operates, the operation parameter controller 305 may continuously adjust the amount of current that is to be discharged by the electric battery storage pack in response to the acceleration request of the driver to be within the discharge current limit 370 available from the electric battery storage pack.

Further based on the percentage of 0-100% of acceleration that is depicted by the first analog voltage 350a and the second analog voltage 350b, the operation parameter controller 305 may also determine the hub motor torque limit 380(a-n) available for each hub motor 330(a-n) as provided by each hub motor 330(a-n) to the EV-ECU 385. The hub motor torque limit 380(a-n) is the hub motor parameter that provides the torque level that is available from each hub motor 330(a-n) to drive the corresponding wheel as the electric delivery truck 110 operates. As the electric delivery truck 110 operates, the torque level that is available to be applied by each hub motor 330(a-n) to drive each corresponding wheel may vary as the electric delivery truck 110 operates based on hub motor parameters based on temperature, wheel slip, and other hub motor parameters that may degrade the operation of each hub motor 330(a-n) thereby decreasing the torque level available by each hub motor 330(a-n).

The operation parameter controller 305 may determine the hub motor torque limit 380(a-n) available from each corresponding hub motor 330(a-n) relative to the first analog voltage 350(a-n) and the second analog voltage 350b that represents the request of the driver as to the amount of operation torque level that the driver would like the electric delivery truck 110 to accelerate. As the hub motor torque limit 380(a-n) for each hub motor 330(a-n) varies as the electric delivery truck 110 operates, the operation parameter controller 305 may continuously adjust the torque level that is to be applied by each hub motor 330(a-n) to drive each corresponding wheel in response to the acceleration request of the driver within the maximum torque limit 380(a-n) available from each hub motor 330(a-n).

The operation parameter controller 305 may then determine a percentage of maximum of torque 390(a-n), where in is an integer equal to the quantity of hub motors 330(a-n), that is to be provided to each corresponding hub motor 330(a-n). The maximum torque is the maximum torque level that is able to be driven by an amount of current that is within the discharge current limit 370 of the electric battery storage pack and also within the hub motor torque limit 380(a-n) of each corresponding hub motor 330(a-n). The percentage of maximum torque 390(a-n) that is provided to each corresponding hub motor 330(a-n) is then a percentage of torque that corresponds to the request of acceleration by the user based on the first analog voltage 350a and the second analog voltage 350b while maintaining the percentage of maximum torque 390(a-n) provided to each corresponding hub motor 330(a-n) within the discharge current limit 370 and the hub motor torque limit 380(a-n) of each corresponding hub motor 330(a-n). Thus, the percentage of maximum torque 390(a-n) applied by each hub motor 330(a-n) as the electric delivery truck 110 executes the route is maintained within the hub motor operation threshold based on the hub motor parameters and operation torque level as requested by the driver.

The operation parameter controller 305 may continuously monitor the hub motor parameters and the operation torque level requested by the electric delivery truck control inputs to maintain the torque level at the percentage of maximum torque 390(a-n) within the discharge current limit 370 allowed by the battery management unit 385 and the hub motor torque limit 380(a-n) allowed by each hub motor 330(a-n) as the electric delivery truck 110 operates to execute the route. The operation parameter controller 305 may continuously adjust the torque level applied by each hub motor 330(a-n) of the electric delivery truck 110 to be at the percentage of maximum torque 390(a-n) that is continuously adjusted as the hub motor parameters and the requested operation torque level continuously change to maintain the torque level within the discharge current limit 370 allowed by the battery management unit 305 and the hub motor torque limit 380(a-n) allowed by each hub motor 330(a-n) that continuously change as the electric delivery truck 110 operates to execute the route.

The operation parameter controller 305 may refrain from providing 100% of maximum torque 390(a-n) at the outset regardless as to whether the request of the driver based on the pressure applied to the accelerator pedal 320 generates a 100% of the first analog voltage 390a and 100% of the second analog voltage 390b. Rather, the operation parameter controller 305 continuously monitors the hub motor parameters and the operation torque level requested by the driver and gradually increases the percentage of maximum torque 390(a-n) provided to each corresponding hub motor 330(a-n). For example, the electric delivery truck 110 may be at a stop in which the acceleration is 0%. The driver may then request 100% acceleration by flooring the accelerator pedal 320. Rather than transitioning from 0% of maximum torque 390(a-n) to 100% of maximum torque 390(a-n), the operation parameter controller 305 may first determine the discharge current limit 370 at the time that the driver requests 100% acceleration.

The operation parameter controller 305 may then gradually increase the percentage of maximum torque 390(a-n) provided to each corresponding hub motor 330(a-n) based on the discharge current limit 370 and the request for acceleration by the driver based on the positon of the accelerator pedal 320. In doing so, the operation parameter controller 305 may conduct a cycle in which over a period of time for each cycle, the operation parameter controller 305 may determine the request for acceleration by the driver based on the percentage of the first analog voltage 390a and the percentage of the second analog voltage 390b corresponding to the position of the accelerator pedal 320 as well as the discharge current limit 370 at each cycle.

At the conclusion of each cycle, the operation parameter controller 305 may then continue to gradually increase the percentage of maximum torque 390(a-n) provided to each corresponding hub motor 330(a-n) should the percentage of the first analog voltage 390a and the percentage of the second analog voltage 309b be maintained and the discharge current limit 370 enables an increase in current to be provided to increase the percentage of maximum torque 390(a-n) for each corresponding hub motor 330(a-n). Thus, the percentage of maximum torque 390(a-n) provided to each hub motor is gradually increased based on the request of acceleration of the driver and the discharge current limit 370.

The operation parameter controller 305 may monitor the hub motor parameters and the operation torque level to determine when an increase in the operation torque level is requested by the electric delivery truck control inputs. The operation parameter controller 305 may automatically adjust the torque level applied by each hub motor 330(a-n) of the electric delivery truck 110 to be at the percentage of maximum torque 390(a-n) that maps a step torque level 430 of different torque levels 440(a-n), where n is an integer equal to or greater than one that are stepped up graduation over a duration of time 470. The operation parameter controller 305 may transition the increase of the torque level at an increased percentage of the maximum torque 390(a-n) to a stepped increase in the torque level over an increased duration of time 450(a-n), where n is an integer equal to or greater than one. The operation parameter controller 305 satisfies the increase in requested operation torque level and maintains the torque level within the discharge current limit 370 allowed by the battery management unit 385 and the hub motor torque limit 380(a-n) allowed by each hub motor 330(a-n) that continuously change as the electric delivery truck 110 operates to execute the route.

For example, as shown in the electric delivery truck hub motor control configuration 400 depicted in FIG. 4, the operation parameter controller 305 may monitor the hub motor parameters and the operation torque level to determine when an increase in the operation torque level of the electric delivery truck 110 is requested by the driver as generated by the execution of the delivery route as the electric delivery truck executes the delivery route based on step torque level 430. FIG. 4 depicts the duration of time 470 relative to electric power drive (Amps) 460 provided by the electric battery storage pack to generate the percentage of maximum torque 440(a-c) provided to each corresponding hub motor 330(a-n).

In such an example, the driver presses on the accelerator pedal 320. The operation parameter controller 305 determines the discharge current limit 460 allowed by the battery management unit 385 as the driver presses on the accelerator pedal 320 and initiates the first cycle of monitoring 450a. The operation parameter controller 305 determines that the discharge current limit 460 as well as the hub motor torque limit 380(a-n) of each corresponding hub motor 330(a-n) allows that the percentage of maximum torque 390(a-n) provided to each corresponding hub motor 330(a-n) be increased to the first electric power drive level 440a as part of the function of the step torque level 430.

At the conclusion of the first cycle of monitoring 450a, the operation parameter controller 305 again determines the percentage of the first analog voltage 350a and the percentage of the second analog voltage 350b as generated by the driver pressing on the accelerator pedal 320 to determine whether the driver continues to request to increase the acceleration of the electric delivery truck 110. The operation parameter controller 305 determines that the current acceleration of the electric delivery truck 110 is not satisfying the acceleration as requested by the driver. The operation parameter controller 305 then commences the second cycle of monitoring 450b and attempts to increase the torque level applied by each hub motor 330(a-n) to increase the acceleration of the electric delivery truck 110. In doing so, the operation parameter controller 305 determines that the discharge current limit 460 allowed by the battery management unit 385 as well as the hub motor torque limit 380(a-n) allows an increase in the percentage of maximum torque 390(a-n) provided to each corresponding hub motor 330(a-n). The operation parameter controller 305 then increases the electric power drive to the second electric power drive level 440b thereby increasing the torque level applied by each hub motor 330(a-n) to increase the acceleration of the electric delivery truck 110 as requested by the driver as part of the function of the step torque level 430.

At the conclusion of the second cycle of monitoring 450b, the operation parameter controller 305 again determines the percentage of the first analog voltage 350a and the percentage of the second analog voltage 350b as generated by the driver pressing on the accelerator pedal 320 to determine whether the driver continues to request to increase the acceleration of the electric delivery truck 110. The operation parameter controller 305 determines that the current acceleration of the electric delivery truck 110 is not satisfying the acceleration as requested by the driver. The operation parameter controller 305 then commences the third cycle of monitoring 450c and attempts to increase the torque level applied by each hub motor 330(a-n) to increase the acceleration of the electric delivery truck 110. In doing so, the operation parameter controller 305 determines that the discharge current limit 460 allowed by the battery management unit 385 as well as the hub motor torque limit 380(a-n) allows an increase in the percentage of maximum torque 390(a-n) provided to each corresponding hub motor 330(a-n). The operation parameter controller 305 then increases the electric power drive to the third electric power drive level 440c thereby increasing the torque level applied by each hub motor 330(a-n) to increase the acceleration of the electric delivery truck 110 as requested by the driver as part of the function of the step torque level 430.

At the conclusion of the third cycle of monitoring 450c, the operation parameter controller 305 determines the percentage of the first analog voltage 350a and the percentage of the second analog voltage 350b as generated by the driver pressing on the accelerator pedal 320 to determine whether the driver continues to request to increase the acceleration of the electric delivery truck 110. The operation parameter controller 305 determines that the current acceleration of the electric delivery truck 110 is satisfying the acceleration as requested by the driver. The operation parameter controller 305 then commences the fourth cycle of monitoring 450d and maintains the torque level applied by each hub motor 330(a-n) to maintain the acceleration of the electric delivery truck 110. In doing so, operation parameter controller 305 determines that the discharge current limit 460 allowed by the battery management unit 385 as well as the hub motor torque limit 380(a-n) allows the maintaining of the percentage of maximum torque 390(a-n) provided to each corresponding hub motor 330(a-n). The operation parameter controller 305 then maintains the electric power drive at the fourth electric power drive level 440c thereby maintaining the torque level applied by each hub motor 330(a-n) to maintain the acceleration of the electric delivery truck 110 as requested by the driver as part of the function of the step torque level 430.

In such an example, other hub parameters may include the inclination of the electric delivery truck 110 as well as a decreased speed in the electric delivery truck 110 as well as decreased acceleration in the electric delivery truck 110 which may indicate that the electric delivery truck 110 may be ascending a hill. As a result, the operation parameter controller 305 may allow an increase in the electric power drive level corresponding to an increase in the percentage of maximum torque 390(a-n) provided by to each hub motor 330(a-n) to overcome the increase in the ascent of the hill in addition to the increase in acceleration requested by the driver at each cycle 450(a-n). In such an example, the operation parameter controller 305 may allow an increase in the percentage of maximum torque 390(a-n) at each cycle 450(a-n) that is still within the discharge current limit 460 at each cycle 450(a-n).

The duration of time of each cycle 450(a-n) may be 1 ms, 5 ms, 10 ms, and/or any other duration of time that enables the operation parameter controller 305 to adjust the percentage of maximum torque 390(a-n) applied to each corresponding hub motor 330(a-n) to satisfy the requests of the driver as well as increase the performance of the operation of the electric delivery truck 110 that will be apparent to those skilled in the relevant art(s) without departing from the spirit and scope of the disclosure. The operation parameter controller 305 may adjust the percentage of maximum torque 390(a-n) applied to each corresponding hub motor 330(a-n) as a step function, linear function, state machine, and/or any other type of function to satisfy the requests of the driver as well as increase the performance of the operation of the electric delivery truck 110 that will be apparent to those skilled in the relevant art(s) without departing from the spirit and scope of the disclosure.

The operation parameter controller 305 may determine the discharge current provided by the battery management unit 305 that is required to satisfy the acceleration percentage requested by the position of the acceleration pedal 320 and whether the required discharge current is within the discharge current limit 370 of the electric battery storage pack as provided by the battery management unit 385 based on a quantity of hub motors 330(a-n) that is required to be activated. The discharge current required to satisfy the acceleration percentage is a function of the quantity of hub motors 330(a-n) that is required to be activated to satisfy the acceleration percentage requested by the position of the acceleration pedal 320. As the electric delivery truck 110 maneuvers along the roadway, the quantity of hub motors 330(a-n) that are required to be activated to satisfy the acceleration percentage requested by the position of the acceleration pedal 320 differs. Rather than activate all of the hub motors 330(a-n) to satisfy the acceleration percentage requested by the position of acceleration pedal 320, activating one hub motor 330(a-n) and/or a combination of hub motors 330(a-n) that still satisfy the acceleration percentage requested by the position of the acceleration pedal 320 while decreasing the quantity of energy consumption required to do so.

For example, the electric delivery truck 110 may be maneuvering along an in incline when the acceleration percentage requested by the acceleration pedal 320 increases significantly due to the driver requesting to compensate for the incline and requests to accelerate at an increased rate. In such an example, the operation parameter controller 305 may activate all of the hub motors 330(a-n) to generate the percentage of torque 390(a-n) to satisfy the increased acceleration percentage requested by the driver. However, as the electric delivery truck 110 transitions from the incline to a flat surface, the operation parameter controller may then automatically deactivate the rear hub motors 330(a-n) and maintain the activation of the front hub motors 330(a-n) due to having all of the hub motors 330(a-n) activated is no longer necessary to satisfy the acceleration percentage requested by the driver due to the transition from the incline to the flat surface based on the inclinometer 325.

The operation parameter controller 305 may determine whether each hub motor 330(a-n) is required to be activated to generate the discharge current that is required to satisfy the acceleration percentage requested by the position of the acceleration pedal 320. An activation of each hub motor 330(a-n) increases the discharge current that is required to satisfy the acceleration percentage requested by the position of the acceleration pedal 320 thereby increasing an acceleration of the electric delivery truck 110 as requested by the driver. The operation parameter controller 305 may evaluate each hub motor 330(a-n) on an individual basis and determine whether each hub motor 330(a-n) is required to be activated to satisfy the acceleration percentage as requested by the driver.

The operation parameter controller 305 may automatically activate and/or deactivate each hub motor 330(a-n) on an individual basis depending on whether the acceleration percentage may be satisfied while decreasing the overall energy consumption of the electric delivery truck 110 to do so. As a result, obtaining the discharge current required to satisfy the acceleration percentage is a function of the quantity of hub motors 330(a-n) required to be activated to satisfy acceleration percentage as each hub motor 330(a-n) is evaluated as whether to be activated such that the discharge current is reached while decreasing the overall energy consumption of the electric delivery truck 110. The operation parameter controller 305 may then activate each selected hub motor 330(a-n) that is determined as required to be activated to generate the discharge current required to generate the discharge current to satisfy the acceleration percentage. Each hub motor 330(a-n) that is not selected to be activated is not required to be activated to generate the discharge current to satisfy the acceleration percentage.

The operation parameter controller 305 may monitor the hub motor parameters and the operation torque level to determine when a decrease in the operation torque level is requested by the electric delivery truck control inputs. The operation parameter controller 305 may automatically adjust the torque level applied by each hub motor 330(a-n) of the electric delivery truck 110 to be at the percentage of maximum torque 390(a-n) that maps to a step torque level 430 that transitions the decrease of the torque level at a decreased percentage of the maximum torque 390(a-n) to a stepped decrease in the torque level over an increased duration of time 470. In doing so, the decrease in the requested operation torque level is satisfied and maintains a charge current generated from the decreased percentage of maximum torque 390(a-n) is within the charge current limit 360 allowed by the battery management unit 385 for regeneration of an electric battery storage pack of the electric delivery truck 110 that continuously changes as the electric delivery truck 110 executes the route.

As discussed in detail above regarding acceleration, the operation parameter controller 305 may operate in a similar manner with regard to controlling the torque level applied by each hub motor 330(a-n) when the electric delivery truck 110 is decelerating. The discussion above with regard to acceleration may be incorporated into the deceleration of the electric delivery truck 110. In doing so, the driver may request to decelerate the electric delivery truck 110. In doing so, the driver may relieve pressure on the acceleration pedal 320 and/or apply pressure to the brake pedal 320 to decelerate the electric delivery truck 110. The position of the pedal 320 may then generate a corresponding voltage 310 that is decreased from the corresponding voltage 310 generated when the driver is requesting to accelerate. The decreased voltage 310 may then be transformed into the first analog voltage 350a and the second analog voltage 350b as a percentage from 0% to 100% in which the percentage is decreased from when the driver is requesting to accelerate down to 0% in which the driver requests that the electric delivery truck 110 transition into the stop position.

The operation parameter controller 305 may then continuously determine the charge current limit 360 as provided by the battery management unit 385 as the electric delivery truck 110 operates relative to the requested deceleration of the electric delivery truck 110 by the driver. As the driver decreases pressure off of the acceleration pedal 320, the electric delivery truck 110 then transitions into deceleration. The transitioning of the electric delivery truck 110 into deceleration triggers the battery management unit 385 to initiate regeneration of electric power for the electric battery storage pack. The deceleration of the electric delivery truck 110 no longer requires electric power to be provided by the electric battery storage pack to drive the electric delivery truck 110 to accelerate and/or maintain the velocity of the electric delivery truck 110. Rather the kinetic energy generated from the wheels of the electric delivery truck 110 as the electric delivery truck 110 decelerates may be transitioned into regenerated electric power that may be stored by the electric battery storage pack.

As a result, the operation parameter controller 305 may continuously monitor the charge current limit 360 to determine the charge current limit 360 of the electric battery storage pack based on the hub motor parameters in which the charge current limit 360 is the maximum level of current in which the electric battery storage pack may accept via the regeneration of electric power during deceleration of the electric delivery truck 110. The current level generated by regeneration of electric power as provided to the electric battery storage pack that exceeds the charge current limit 360 of the electric battery storage pack requires the operation parameter controller 305 to then disenable the regeneration as the electric delivery truck 110 decelerates to prevent damage to the electric battery storage pack. The charge current limit 360 of the electric battery storage pack may continuously change as the electric delivery truck 110 operates based on the hub motor parameters. The operation parameter controller 305 may then continuously monitor the charge current limit 360 of the electric battery storage pack via the battery management unit 385 with regard to the regeneration of electric power during deceleration of the electric delivery truck 110.

The operation parameter controller 305 may then automatically adjust the torque level applied by each hub motor 330(a-n) to be at a percentage of maximum torque 390(a-n) that maps to a step torque level that transitions the decrease of the percentage of maximum torque 390(a-n) applied by each hub motor 330(a-n) as a duration of time increases to satisfy the requested decrease in operation torque level by the driver. In a similar manner as discussed in detail above regarding the step torque level 430 in acceleration, the operation parameter controller 305 similarly decreases the percentage of maximum torque 390(a-n) applied by each hub motor 330(a-n) by periodically monitoring the request in deceleration from the driver as well as the charge current limit 360 allowed by the battery management unit 385. Following the completion of each period, the operation parameter controller 305 may continue to step down the percentage of maximum torque 390(a-n) applied by each hub motor 330(a-n) while enabling regeneration of electric power during the deceleration as long as the driver continues to request deceleration and the charge current limit 360 allows regeneration to continue. As each hub motor 330(a-n) decreases the torque level applied to each wheel, the deceleration of each wheel continues to decrease.

The operation parameter controller 305 may determine a charge current provided by the electric battery storage pack to enable the electric battery storage pack to be charged based on the deceleration percentage requested by the position of the acceleration pedal 320. The operation parameter controller 305 may determine whether the charge current that is to be generated with the deceleration percentage is within the charge current limit 360 of the electric battery storage pack for regeneration as provided by the battery management unit 385. The operation parameter controller 305 may do so based on a first quantity of hub motors 330(a-n) that is required to be activated to drive the electric delivery truck 110 and a second quantity of hub motors 330(a-n) that is required to be transitioned into a regeneration mode. The regeneration mode is triggered in which the electric battery storage pack regenerates electric power based on the second quantity of hub motors 330(a-n) that generate kinetic energy while not activated to drive the electric delivery truck 110.

The charge current required to enable the electric battery storage pack to be charged based on the deceleration percentage is a function of the first quantity of hub motors 330(a-n) that is required to be activated to satisfy the deceleration percentage required by the position of the acceleration pedal 320 and the second quantity of hub motors 330(a-n) that is required to be transitioned into the regeneration mode to enable the electric battery storage pack to be charged based on the deceleration percentage. As the electric delivery truck 110 maneuvers along the roadway, the quantity of hub motors 330(a-n) that are required to be activated to satisfy the deceleration percentage requested by the position of the acceleration pedal 320 differs. Rather than activate all of the hub motors 330(a-n) to satisfy the deceleration percentage requested by the position of acceleration pedal 320, activating one hub motor 330(a-n) and/or a combination of hub motors 330(a-n) that still satisfy the deceleration percentage requested by the position of the acceleration pedal 320 while decreasing the quantity of energy consumption required to do so. Since the electric delivery truck 110 is decelerating, the hub motors 330(a-n) not required to be activated to still drive the electric delivery truck 110 during deceleration, such remaining hub motors 330(a-n) that are not activated may be transitioned into regeneration mode such that the kinetic energy generated by the hub motors 330(a-n) not activated to drive the electric delivery truck 110 may thereby be converted to enable the electric battery storage pack to be charged based on the deceleration percentage.

For example, the electric delivery truck 110 may be maneuvering along an in incline when the acceleration percentage requested by the acceleration pedal 320 increases significantly due to the driver requesting to compensate for the incline and requests to accelerate at an increased rate. In such an example, the operation parameter controller 305 may activate all of the hub motors 330(a-n) to generate the percentage of torque 390(a-n) to satisfy the increased acceleration percentage requested by the driver. However, as the electric delivery truck 110 transitions from the incline to a decline, the operation parameter controller may then automatically deactivate the rear hub motors 330(a-n) and maintain the activation of the front hub motors 330(a-n) due to having all of the hub motors 330(a-n) activated is no longer necessary to satisfy the deceleration percentage requested by the driver due to the transition from the incline to the decline surface based on the inclinometer 325. In doing so, the rear hub motors 330(a-n) that are deactivated may transition into the regeneration mode thereby enabling the electric battery storage pack to be charged based on the deceleration percentage requested by the driver.

The operation parameter controller 305 may activate each selected hub motor 330(a-n) from the first quantity of hub motors 330(a-n) that is determined as required to be activated to drive the electric delivery truck to satisfy the deceleration percentage required by the position of the acceleration pedal 320. The operation parameter controller 305 may evaluate each hub motor 330(a-n) on an individual basis and determine whether each hub motor 330(a-n) is required to be activated to satisfy the deceleration percentage as requested by the driver. The operation parameter controller 305 may transition each selected hub motor 330(a-n) from the second quantity of hub motors 330(a-n) into the regeneration mode that is determined to generate the charge current to enable the electric battery storage pack to be charged based on the deceleration percentage requested by the position of the acceleration pedal 320. Each hub motor 330(a-n) that is transitioned into the regeneration mode is not required to be activated to drive the electric delivery truck 110 to satisfy the deceleration percentage required by the position of the acceleration pedal 320.

The operation parameter controller 305 may automatically activate and/or deactivate each hub motor 330(a-n) on an individual basis depending on whether the deceleration percentage may be satisfied while regenerating electric power as stored by the electric battery storage pack based on the hub motors 330(a-n) that are transitioned into regeneration mode and not needed to drive the electric delivery truck 110. As a result, obtaining the charge current required to enable the electric battery storage pack to be charged while still satisfying the deceleration percentage requested by the driver is a function of the first quantity of hub motors 330(a-n) required to be activated to satisfy deceleration percentage as each hub motor 330(a-n) is evaluated as whether to be activated such that the deceleration percentage. However, each of the remaining hub motors 330(a-n) that are not activated from the second quantity of hub motors 330(a-n) may be transitioned into regeneration mode to provide electric power to the electric battery storage pack. The operation parameter controller 305 may then activate each selected hub motor 330(a-n) that is determined as required to be activated to satisfy the deceleration percentage. Each hub motor 330(a-n) that is not selected to be activated is then transitioned into regeneration mode to generate electric power to be stored by the electric battery storage pack.

The operation parameter controller 305 may customize the decrease in the percentage of maximum torque 390(a-n) applied by each hub motor 330(a-n) to each corresponding wheel based on the hub motor parameters as the electric delivery truck 110 operates in response to the request of the driver to decelerate. For example, the driver requests to decelerate by decreasing pressure on the acceleration pedal 320 and/or increasing the pressure on the brake pedal 320. In response, the operation parameter controller 305 may monitor the charge current limit 360 of the electric battery storage pack as provided by the battery management unit 385 and then accordingly begins to decrease the percentage of torque 390(a-n) applied by each hub motor 330(a-n) while initiating regeneration. However, the operation parameter controller 305 then detects that wheel of the front driver side has contacted a patch of ice in which the hub motor sensor 315 is indicating that the front driver side wheel is spinning at an increased level with a decrease level of grip compared to the remaining three wheels despite the decrease in the percentage of torque 390a applied by the hub motor 330a to the front driver side wheel.

The operation parameter controller 305 may then automatically continue to decrease the percentage of torque 390(*b-c*) applied by the hub motors 330(*b-n*) that correspond to the remaining wheels that are operating properly indicating that those remaining wheels are not having issues with a patch of ice. In doing so, the operation parameter controller 305 may compensate for the front driver side wheel that is slipping and has less grip due to the ice by decreasing the torque level 390(*b-c*) applied to the remaining wheels to further stabilize the electric delivery truck 110 despite the front driver side wheel slipping on the ice. The operation parameter controller 305 may also automatically disconnect the hub motor 330*a* that is associated with the front driver side wheel that is slipping from regenerating electric power that is provided to the electric battery storage pack as that increased frequency in spinning of the front driver side wheel due to the ice patch may increase the current regenerated by the front driver side wheel to exceed the charge current limit 360 of the electric battery storage pack.

After the operation parameter controller 305 has determined the percentage of maximum torque 390(*a-n*) for each corresponding hub motor 330(*a-n*) to apply to each corresponding wheel, the operation parameter controller 305 may send a signal representing each percentage of maximum torque 390(*a-n*) to an inverter 340(*a-n*), where n is an integer equal to the quantity of hub motors 330(*a-n*). Each inverter 340(*a-n*) may then transform each signal representing each corresponding percentage of maximum torque 390(*a-n*) such that each signal is inverted into a PWM signal. Each inverter 340(*a-n*) may generate each PWM signal that is proportional to each percentage of maximum torque 390(*a-n*) that each corresponding hub motor 330(*a-n*) is to apply to each corresponding wheel. Each hub motor 330(*a-n*) may then receive the corresponding PWM signal which is a three-phase signal and then drive the corresponding wheel at the torque percentage of maximum torque 390(*a-n*) as provided by the corresponding PWM signal. As the operation parameter controller 305 continuously adjusts the percentage of maximum torque 390(*a-n*) to be applied by each corresponding hub motor 390(*a-n*), the corresponding PWM is also continuously adjusted accordingly, thereby instructing each hub motor 330(*a-n*) to continuously adjust the torque level applied to each corresponding wheel, accordingly.

The percentage of maximum of torque 390(*a-n*) applied by each hub motor 330(*a-n*) may be customized such that the percentage of maximum torque 390(*a-n*) applied by each hub motor may be individualized per each hub motor 390(*a-n*). The operation parameter controller 305 may individually adjust the torque level applied by each hub motor 330(*a-n*). In doing so, each hub motor 330(*a-n*) each individually networked over the CAN bus where each hub motor 330(*a-n*) has an individual CAN address. Each signal that represents the percentage of maximum torque 390(*a-n*) that is to be applied by each hub motor 330(*a-n*) is then individually transmitted to each hub motor 330(*a-n*) individually via each CAN address that corresponds to each individual hub motor 330(*a-n*) via the CAN bus. Rather than sending the same signal that represents the percentage of maximum torque 390(*a-n*) to each hub motor 330(*a-n*) that results in the each hub motor 330(*a-n*) applying the same torque level to each wheel, the CAN bus enables the operation parameter controller 305 to transmit a customized signal to each hub motor 330(*a-n*) individually. As a result, each hub motor 330(*a-n*) may apply a different percentage of maximum torque 390(*a-n*) at any time as compared to each of the other hub motors 330(*a-n*) dependent on the individual signal transmitted by the operation parameter controller 305 to each individual hub motor 330(*a-n*) via the CAN bus.

The percentage of torque 390(*a-n*) applied by each hub motor 330(*a-n*) may be customized for each wheel in that the percentage of torque 390(*a-n*) applied by each hub motor 330(*a-n*) may be increased relative to the other hub motors 330(*a-n*), be decreased relative to the other hub motors 330(*a-n*), be forward torque levels relative to the other hub motors 330(*a-n*), reverse torque levels relative to the other hub motors 330(*a-n*), be maximum torque level frontwards, be maximum torque level backwards, be minimum torque level frontwards, minimum torque level backwards, be substantially similar to one or more of the other hub motors 330(*a-n*), be customized to be different than the other hub motors 330(*a-n*), and/or any other customized torque level and/or combination thereof based on the hub motor parameters as determined by the operation parameter controller 305 to respond to the request of the driver while increasing the performance of the electric delivery truck 110 as the electric delivery truck 110 operates that will be apparent to those skilled in the relevant art(s) without departing from the spirit and scope of the disclosure.

The application of hub motors 330(*a-n*) that drive each corresponding wheel as compared to a conventional electric motor enables the floor of the electric delivery truck 110 to be lowered. The conventional electric motor that is typically positioned within the chassis of the conventional electric vehicle also requires a gear box which is also positioned within the chassis of the conventional electric vehicle. The conventional electric motor and conventional gear box have a depth in which the conventional electric vehicle have a floor that is positioned at increased distance above the ground in order to provide sufficient clearance for the conventional electric motor and gear box above the ground such that the conventional electric motor and gear box do not scrape the ground as the conventional electric vehicle maneuvers along the roadway. In doing so, any type of step for a delivery operator to step from the conventional electric vehicle and reach the ground to deliver a package is an increased distance from the ground thereby requiring an increased wear and tear on the body of the delivery operator.

However, the application of each hub motor 330(*a-n*) to the electric delivery truck 110 positions the hub motors 330(*a-n*) at a proximate location to each corresponding wheel that each hub motor 330(*a-n*) is to drive in which each hub motor 330(*a-n*) is positioned along the perimeter of the chassis. Further, the control of each hub motor 330(*a-n*) via the operation parameter controller 305 via signals that represent the commands for each hub motor 330(*a-n*) eliminates the need for a conventional gear box. The elimination of the conventional electric motor and the conventional gear box with the application of hub motors 330(*a-n*) enables the floor of the electric delivery truck 110 to be a decreased distance above the ground as compared to the conventional electric vehicle that incorporates the conventional electric motor and the conventional gear box. As a result, the wear and tear of the body of the delivery operator is significantly decreased due to the decreased distance in which the delivery operator has to step to get into and out of the electric delivery truck 110 while executing each delivery.

Electric Delivery Truck Hub Motor Control Applications

As discussed in detail above, the operation parameter controller 305 may continuously adjust the torque level applied by each hub motor 330(*a-n*) to each corresponding wheel based on the electric delivery truck control inputs and the hub motor parameters. The operation parameter controller 305 may have independent control of each of the hub motors 330(*a-n*) thereby resulting in independent four wheel torque control. The operation parameter controller 305 may adjust the torque level applied by each hub motor 330(*a-n*) to each corresponding wheel in any range from 0 to 100% of maximum torque and may do so in both applying a reverse torque to each hub motor 330(*a-n*) as well as a forward torque 330(*a-n*) to each hub motor 330(*a-n*).

Such flexibility of adjusting the torque level applied by each hub motor 330(*a-n*) from 0 to 100% of maximum torque and the continuous adjustment of the torque level applied by each hub motor 330(*a-n*) to each wheel on an individual basis in both reverse torque and forward torque provides increased control over the operation of the wheels as well as eliminating the need to apply conventional brakes. For example, should a wheel get stuck, the operation parameter controller 305 may automatically limit the torque level applied to the stuck wheel by the corresponding hub motor 330(*a-n*). The operation parameter controller 305 may also while adjusting the direction of the torque from forward and/or reverse as well as the torque level applied by the hub motors 330(*a-n*) accordingly to the unstuck wheels to increase the performance of the electric delivery truck 110 in overcoming the stuck wheel to continue to have the electric delivery truck 110 maneuver along the roadway.

In doing so, the operation parameter controller 305 may monitor the acceleration of the electric delivery truck 110 as the electric delivery truck 110 operates to determine whether the acceleration of the electric delivery truck 110 exceeds an acceleration threshold. The acceleration threshold that when exceeded requires that the operation parameter controller 305 to activate each of the hub motors 330(*a-n*) and transition each of the hub motors 330(*a-n*) to apply an increased torque level to each corresponding wheel in order to accelerate the electric delivery truck 110. In doing so, each of the hub motors 330(*a-n*) may generate sufficient energy such that the electric delivery truck 110 is able to attain the acceleration requested by the driver of the electric delivery truck 110.

The operation parameter controller 305 may then monitor the acceleration of the electric delivery truck 110 as the electric delivery truck 110 operates after the electric delivery truck 110 has reached a steady state in operation after acceleration to determine if the acceleration of the electric delivery truck 110 decreases below the acceleration threshold. After the acceleration of the electric delivery truck 110 has decreased below the acceleration threshold, the operation parameter controller 305 may deactivate one or more hub motors 330(*a-n*) while maintaining the remaining hub motors 330(*a-n*) in an activated state. After the acceleration of the electric delivery truck 110 has decreased below the acceleration threshold, the electric delivery truck 110 no longer requires each of the hub motors 330(*a-n*) to be activated to generate sufficient energy for the electric delivery truck 110 to operate.

For example, the driver of the electric delivery truck 110 may request to accelerate the electric delivery truck 110 to a speed of 55 mph. In order for the electric delivery truck 110 to accelerate to a speed of 55 mph, the electric delivery truck 110 requires 150 KW to accelerate to a speed of 55 mph. In doing so, the operation parameter controller 305 may activate each of the hub motors 330(*a-n*) once the driver requests to accelerate the electric delivery truck 110 above the acceleration threshold. After the electric delivery truck 110 accelerates to a speed of 55 mph, the driver of the electric delivery truck 110 may allow the electric delivery truck 110 to reach a steady state of limited acceleration and then may allow the electric delivery truck 110 to decelerate to 45 mph. The electric delivery truck 110 requires 75 KW to decelerate and then operate at 45 mph. The activation of each of the hub motors 330(*a-n*) is not necessary to provide sufficient energy for the electric delivery truck 110 to decelerate and then operate at 45 mph. As a result, the operation parameter controller 305 may deactivate the hub motor 330*a* and the hub motor 330*b* while maintaining the hub motor 330*c* and the hub motor 330*n* in an activated state to provide the sufficient energy for the electric delivery truck 110 to decelerate and operate at 45 mph after the acceleration of the electric delivery truck decreases below the acceleration threshold.

During deceleration below the acceleration threshold, the hub motor 330*c* and the hub motor 330*n* that is activated while the hub motor 330*a* and the hub motor 330*b* is deactivated, the hub motor 330*c* and the hub motor 330*n* may generate energy that is then stored in the electric battery storage pack as instructed by the operation parameter controller 305. As the electric delivery truck 110 decelerates below the acceleration threshold, the hub motor 330*c* and the hub motor 330*n* are no longer required to generate energy to drive the electric delivery truck 110 but may rather operate to generate energy obtained from the kinetic energy generated as the electric delivery truck 110 operates along the roadway and then store such energy in the electric battery storage pack.

Rather than simply having the hub motor 330*c* and the hub motor 330*n* generate energy to store in the electric battery storage pack as the electric delivery truck 110 decelerates below the acceleration threshold, the operation parameter controller 305 may activate the hub motor 330*a* and the hub motor 330*b* that was previously deactivated due to the hub motor 330*a* and the hub motor 330*b* not required to adequately drive the electric delivery truck 110 as the electric delivery truck operates 110. In doing so, all of the hub motors 330(*a-n*) may generate energy from the kinetic energy generated as the electric delivery truck 110 operates and store such generated energy in the electric battery storage pack. Thus, additional energy may be stored in the electric battery storage pack as the electric delivery truck 110 decelerates below the acceleration threshold from the activation of the hub motor 330*a* and the hub motor 330*b* in addition to the hub motor 330*c* and the hub motor 330*n* to as compared to just the hub motor 330*c* and the hub motor 330*n* operating as the electric delivery truck 110 decelerates below the acceleration threshold.

The operation parameter controller 305 may also substitute the functionality of an ABS system with the automatic adjusting of the torque level applied by each hub motor 330(*a-n*) as well as the automatic adjustment of applying forward torque or reverse torque to each wheel on an individual basis in response to hub motor parameters that indicate that one or more of the wheels slipping as the electric delivery truck 110 operates. Rather than have a conventional ABS controller that pulses signals to the conventional brake calipers to adjust the pressure of each conventional brake applied to each corresponding wheel in response to a wheel potentially slipping, the operation parameter controller 305 may pulse torque commands to each hub motor 330(*a-n*) on an individual basis which instructs each hub motor 330(*a-n*) to automatically adjust the torque level applied to each corresponding wheel in reverse torque or forward torque in response hub motor parameters that indicate one or more wheel is slipping.

For example, the operation parameter controller 305 may determine that the hub motor parameters of wheel speed, traction and/or grip, and slip are indicating that the front driver wheel is out of synch with the remaining wheels and/or slipping. The operation parameter controller 305 may continuously adjust the torque level applied by the hub motor 330*a* to the slipping wheel as well as continuously adjust the torque applied to the slipping wheel between forward and reverse. The operation parameter controller 305 may also simultaneously and individually adjust the torque level applied by the hub motors 330(*b-n*) to the remaining wheels that are not out of synch and/or slipping as well as the continuously adjust the torque applied to the non-slipping wheels between forward and reverse until there is no further indication from the hub motor parameters that the front driver wheel is no longer out of synch and/or slipping.

As noted above, conventional ABS requires that the driver determine that one or more wheels is slipping and then in pumping the brakes, the conventional ABS system begins to pulse the brake calipers such that the brake calipers assist in the one or more wheels slipping. Rather than pulsing the brake calipers by the conventional ABS, the operation parameter controller 305 may determine based on the hub motor parameters that one or more wheels are susceptible to slipping. The operation parameter controller 305 as a function of torque may continuously pulse each hub motor 330(*a-n*) individually to individually control each hub motor 330(*a-n*) relative to each other hub motor 330(*a-n*) in order to customize the torque level as well as the direction of torque applied by each hub motor 330(*a-n*) to each corresponding wheel to overcome the slippage of one or more wheels without any user invention and thereby eliminating the need for a conventional ABS controller. For example, the operation parameter controller 305 may determine that the front driver side wheel and the rear passenger side wheel is slipping. Rather than have a conventional ABS controller pulse the conventional brake calipers of each wheel, the operation parameter controller 305 may automatically adjust the torque level and the direction of torque from reverse or forward independently to the front driver side wheel and the rear passenger side wheel as opposed to uniformly applying the conventional brakes to each of the four wheels.

The operation parameter controller 305 may monitor the hub motor parameter of speed differential between each of the four wheels of the electric delivery truck 110 to determine whether one or more of the wheels are in a position to begin to slip. The hub motor sensors 315 may include wheel speed sensors in which each wheel speed sensor that continuously monitors the speed of each corresponding wheel as the electric delivery truck 110 operates. The operation parameter controller 305 may continuously monitor the wheel speed of each individual wheel to determine when the wheel speed of any of the four wheels begins to differentiate from the wheel speed of the remaining wheels. As long as the wheel speed of each of the four wheels as monitored by the corresponding wheel speed sensors remains within a wheel speed threshold of each other, the operation parameter controller 305 may determine that each of the wheels are operating without slip as the electric delivery truck 110 operates. However, the deviation of the wheel speed of one or more of the wheels from each other in which the wheel speed of one or more of the wheels differentiates from the wheel speed of the remaining wheels beyond the wheel speed threshold of each other is indicative slip. The operation parameter controller 110 may determine that the one or more wheels that has a corresponding wheel speed that differentiates beyond the wheel speed threshold of the other wheels that such wheels are beginning to slip.

As the electric delivery truck 110 maneuvers along the roadway and one or more wheels generate a wheel speed that increases and/or decreases beyond the wheel speed threshold of the other wheels is indicative that such wheels are beginning to slip due to mud, ice, and/or any other condition that may trigger slip. Based on the wheel speed differential as compared to the other wheels, the operation parameter controller 305 may then automatically adjust the torque level applied by each of the hub motors 330(*a-n*) that correspond to the wheels that have wheels speeds that are deviating beyond the wheel speed threshold to increase the torque level in the reverse direction to apply a braking force by each of the hub motors 330(*a-n*) to the corresponding wheels that are indicating slip due to the deviation in the wheel speeds from the other wheels. The operation parameter controller 305 may then determine that the wheel speed of the wheels that were deviating from the wheel speed threshold are no longer doing so thereby indicating that such wheels are no longer slipping.

The driver may continue to request to decelerate. If so, as discussed above, the operation parameter controller 305 may then continue to gradually increase the torque level in the reverse direction applied by all of the hub motors 330(*a-n*) to each of the corresponding wheels after the wheel speed of the wheels that were deviating beyond the wheel speed threshold are no longer deviating to continue to safely decelerate the electric delivery truck 110. As a result, the operation parameter controller 305 may continue to individually adjust the torque level applied by each of the hub motors 330(*a-n*) to each of the corresponding wheels that have wheel speeds that differentiate beyond the wheel speeds of the remaining wheels until such differential of wheel speeds are within the wheel speed threshold thereby indicating that the slippage of such wheels has stopped.

As discussed above, the driver may request to decelerate by decreasing pressure off of the accelerator pedal 320 or applying pressure to the brake pedal 320 to decrease the speed of the electric delivery truck 110. Kinetic energy generated by the electric delivery truck 110 during acceleration of the electric delivery truck 110 may then continue to be generated during the deceleration of the electric delivery truck 110 and such kinetic energy may then be stored as regenerated electric power in the electric battery storage pack. In doing so, the kinetic energy continues to spin the wheels as the electric delivery truck 110 maneuvers along the roadway thereby enabling the electric motors to act as generators and convert that kinetic energy into electric power that is then stored in the electric battery storage pack.

As discussed above, the operation parameter controller 305 may instruct each corresponding hub motor 330(*a-n*) to apply a torque level to each corresponding wheel in reverse such that the reverse torque applied to each corresponding wheel acts as a braking function to decelerate the electric delivery truck 110. The electric delivery truck 110 is already maneuvering forward with a forward force when accelerating, the reverse torque applied by each hub motor 330(*a-n*) to each corresponding wheel then decelerates the electric delivery truck 110. However, the electric delivery truck 110 continues to move forward and decelerates in a gradual manner as discussed in detail above due to the pulsing of the reverse torque commands to each hub motor 330(*a-n*) by the operation parameter controller 305. In doing so, that applying of reverse torque level while the electric delivery truck 110 is moving forward but gradually decelerating due to the reverse torque applied by each hub motor 110 may generate energy that may then be regenerated by each hub motor 330(*a-n*) and converted into electric power and stored in the electric battery storage pack. Thus, as a reverse torque level is applied by any one or combination of hub motors 330(*a-*

$n$), the negative G-force of the electric delivery truck of the electric delivery truck 110 in response to the reverse torque level applied by one or more of the hub motors 330($a$-$n$) may result in regeneration of electric power that is then stored by the electric battery storage pack.

As discussed above, the operation parameter controller 305 may monitor the differential in hub motor parameters between each of the wheels as the electric delivery truck 110 operates to determine whether the torque level and/or transitioning between reverse torque and/or forward torque should be applied by the hub motors 330($a$-$n$) associated with the one or more wheels that may have hub motor parameters that are differentiating beyond the other wheels. However, as the electric delivery truck 110 operates in decreased speeds, the wheels may operate at wheel speeds that may differentiate more from each other than when the electric delivery truck 110 is operating at increased speeds. As a result, there may be a wheel speed differential between the wheels that is increased but still indicative that each wheel of the electric delivery truck 110 is operating properly and does not require an automatic torque level adjustment and/or torque direction between forward and/or reverse.

Rather than evaluating whether the wheel speed of each wheel deviates from the wheel speed threshold of the other wheels thereby indicating that the differential in wheel speed from the other wheels requires intervention by the operation parameter controller 305, the operation parameter controller 305 may predict based on the hub motor parameters 305 how each wheel should be operating. The operation parameter controller 305 may then determine the difference threshold between each of the wheels based on the prediction of how each wheel should be operating. The operating parameter controller 305 may then automatically adjust the torque level applied by each hub motor 330($a$-$n$) to the one or more wheels that have hub motor parameters that are exceeding the difference threshold. The difference threshold is the prediction of the operation parameter controller 305 of the wheel speed of the corresponding wheels in reaction to specified hub motor parameters such as when the electric delivery truck 110 is operating below a decreased speed threshold.

The electric delivery truck 110 when operating below the decreased speed threshold may result in different wheels of the electric delivery truck 110 operating at wheels speeds that exceed the wheel speed threshold due to the operation of the electric delivery truck 110 at the decreased speed but yet the electric delivery truck 110 is still operating properly at the decreased speed. In doing so, the operation parameter controller 305 may refrain from unnecessarily adjusting the torque level as well as the torque direction between forward and/or reverse during situations in which one or more wheels may operate at a difference from the remaining wheels while still having the electric delivery truck 110 operate properly. However, the electric delivery truck 110 may automatically adjust the torque level and/or torque direction to any wheel that has a wheel speed that exceeds the difference threshold as discussed in detail above with regard to the wheel speed threshold.

For example, the electric delivery truck 110 may maneuver through a curve at a decreased speed. The maneuvering through the curve at the decreased speed may result in the inner wheels having a wheel speed that is less than the wheel speed of the outer wheels thereby resulting in the inner wheels having a wheel speed differential compared to the outer wheels that exceeds the wheel speed threshold during operation of the electric delivery truck 110 at increased speeds. However, the decreased wheel speed of the inner wheels as compared to the outer wheels as the electric delivery truck 110 maneuvers through the curve at the decreased speed may result in proper operation of the electric delivery truck 110 and any automatic adjustment of the torque level and/or torque direction by the operation parameter controller 110 to the hub motors 330($a$-$n$) may be unnecessary.

Instead, the operation parameter controller 305 may determine that the electric delivery truck 110 is maneuvering through the curve at the decreased speed based on the hub motor parameters. The operation parameter controller 305 may then predict the wheel speed of the inner wheels and the wheel speed of the outer wheels. The decreased wheel speed of the inner wheels as compared to the outer wheels may exceed the wheel speed threshold but the operation of the electric delivery truck 110 below the decreased speed threshold is still indicative that the electric delivery truck 110 is properly operating when maneuvering through the curve at decreased speeds. The operation parameter controller 305 may refrain from automatically adjusting the torque level and/or torque direction by the hub motors 330($a$-$n$) to the inner wheels when the wheel speed of the inner wheels are still within the difference threshold. The prediction of the wheel speed of the inner wheels by the operation parameter controller 305 that are within the difference threshold of the actual wheel speed of the inner wheels as the electric delivery truck 110 maneuvers along the curve at the decreased speed is indicative that the electric delivery truck 110 is still operating properly along the curve at the decreased speed despite the wheel speed of the inner wheels deviating from the wheel speed threshold of the wheel speed of the outer wheels. However, the operation parameter controller 305 may automatically adjust the torque level and/or torque direction applied by the corresponding hub motors 330($a$-$n$) to the inner wheels when the wheel speed of the inner wheels exceeds the difference threshold.

The operation parameter controller 305 may determine to automatically adjust the torque level and/or torque direction applied by each hub motor 330($a$-$n$) to each corresponding wheel based on the terrain. The operation parameter controller 305 may monitor the hub motor parameters to determine the terrain that the electric delivery truck 110 is operating and then automatically adjust the torque level and/or torque direction applied by each hub motor 330($a$-$n$) to each corresponding wheel based on the terrain. Conventional electric vehicles include a conventional electric motor, a conventional gear box, and then a conventional front axle and a conventional rear axle. Conventional electric vehicles that encounter a change in terrain such as bumpy off-road, such conventional electric vehicles simply apply a uniform acceleration and/or braking to each of the wheels despite one or more wheels having grip on the bumpy off-road and the remaining wheels not having any grip. Such lack of customization of the torque level applied to each wheel in response to the terrain decreases the performance of the conventional electric vehicle in handling the terrain.

Rather the operation parameter controller 305 may determine the terrain that the electric delivery truck 110 is operating based on the hub motor parameters and in response to the terrain, the electric delivery truck 110 may continuously customize the torque level and torque direction applied by each hub motor 330($a$-$n$) to each corresponding wheel in reaction to each wheel encountering the terrain. As discussed in detail above, the operation parameter controller 305 may automatically decrease the torque level with a reverse torque direction to the wheels that are slipping as the operation parameter controller 305 may determine while continuing to gradually increase the torque level with a forward torque direction that is applied to wheels that are not slipping as the electric delivery truck 110 operates to gradually decelerate the electric delivery truck 110 safely. Similarly, the operation parameter controller 305 may automatically adjust the torque level and the torque direction applied by each hub motor 330(*a-n*) to each corresponding wheel in reaction to how each wheel is operating based on the terrain that the electric delivery truck 110 is maneuvering.

For example, the operation parameter controller 305 may determine that the electric delivery truck 110 is maneuvering along an off-road terrain with numerous bumps and holes resulting in a differentiation in the level of ground that each wheel is operating which is constantly changing as the electric delivery truck 110 operates. The operation parameter controller 305 may also determine that the electric delivery truck 110 is maneuvering along an increased incline in addition to the off-road terrain. As the electric delivery truck 110 maneuvers along the increased incline of the off-road terrain, each of the wheels may continuously encounter different levels of ground related to the other wheels based on the numerous bumps and holes.

In such an example, the electric delivery truck 110 may encounter a hole in which the front driver side wheel is maintaining traction while the remaining wheels are slipping in addition to the electric delivery truck 110 attempting to climb the increased incline. The operation parameter controller 305 may then identify that the front driver side wheel at the current period of time has an increased traction and the remaining wheels are slipping based on the hub motor parameters. Rather than uniformly continue to apply a substantially similar torque level and in the same torque direction, the operation parameter controller 305 may identify that currently the front driver side wheel is the only wheel that may assist the electric delivery truck 110 in moving out of the hole while climbing the incline based on the inclinometer 325. As a result, the operation parameter controller 305 may automatically increase the torque level in the forward direction applied by the hub motor 330*a* to the front driver side wheel that has the traction while decreasing the torque level applied to the remaining wheels that are slipping.

In doing so, the operation parameter controller 305 may concentrate the electric power in driving the torque level in the forward direction by the hub motor 330*a* to the front driver side wheel as the front driver side wheel is the wheel in the current period of time that is going to assist the electric delivery truck 110 in maneuvering out of the hole while continuing to climb the increased incline based on the inclinometer 325. Additional torque level applied to the remaining wheels that are slipping would simply be a wasted use of electric power as such applied torque level to the slipping wheels would have no impact in assisting the electric delivery truck 110 in maneuvering out of the hole while climbing the increased incline. As a result the torque level and torque direction is automatically adjusted and applied appropriately by each hub motor 330(*a-n*) to each corresponding wheel in response to the terrain as well as the current state of each wheel in response to the terrain as the electric delivery truck 110 operates.

The operation parameter controller 305 continuously determine the maximum level of torque that each hub motor 330(*a-n*) may apply to each corresponding wheel as the electric delivery truck 110 maneuvers along the terrain based on the discharge current limit 370 as provided by the battery management unit and the torque limit of each hub motor 330(*a-n*). As discussed above, the operation parameter controller 305 may determine that the electric delivery truck 110 is maneuvering along terrain with an increased incline and as well as a bumpy road with holes with various depths based on the hub motor parameters. In doing so, the operation parameter controller 305 may then pre-emptively determine that the electric delivery truck 110 is maneuvering along terrain with increased incline as well as the bumpy road before the various hub motor parameters generated from the wheels begin to indicate the change in terrain based on the inclinometer 325.

The operation parameter controller 305 may then determine the wheel that is generating the slowest wheel speed as the electric delivery truck 110 is maneuvering along the terrain as the wheel generating the slowest wheel speed is indicative that wheel is engaging the terrain and has increased traction and decreased slip as compared to the remaining wheels. The remaining wheels may not be engaging the terrain thereby having decreased traction and increased slip. As a result, the operation parameter controller 305 may then gradually increase the percentage of torque 390(*a-n*) as applied by the corresponding hub motor 330(*a-n*) in a ramp function as discussed above to the wheel that has the decreased wheel speed. In doing so, the operation parameter controller 305 focuses the electric power to increase the percentage of torque 390(*a-n*) to the wheel with decreased wheel speed as that wheel has the greatest potential to continue to the electric delivery truck 110 forward along the terrain. The operation parameter controller 305 may also decrease the percentage of torque 39(*a-n*) to the wheels with increased wheel speed as such wheels are likely slipping with little traction and decreasing the percentage of torque 390(*a-n*) applied to such wheels refrains from unnecessary consumption of electric power.

The operation parameter controller 305 may then monitor when the wheel speed of the wheel with the decreased wheel speed increases and catches up to the wheel speed of the remaining wheels. The increase of the wheel speed of the wheel with the decreased wheel speed relative to the remaining wheels to catch up to the wheel speed of the remaining wheels is indicative that such wheel is no longer the wheel with the increased traction and as compared to the remaining wheels. The electric delivery truck 110 has likely moved position along the terrain and the initial wheel with the decreased wheel speed is no longer the wheel with the increased traction based on the terrain. The operation parameter controller 305 may then automatically determine the current wheel with the hub motor parameter of the decreased wheel speed compared to the wheel speed of the remaining wheels.

In identifying the current wheel with the decreased wheel speed compared to the wheel speed of the remaining wheels, the operation parameter controller 305 may then automatically gradually increase the percentage of torque 390(*a-n*) for the current wheel with the increased wheel speed as that current wheel is now the wheel with the increased traction and decreased slip as compared to the remaining wheels. Such an increase in percentage of torque 390(*a-n*) to the current wheel with increased wheel speed and a decrease in percentage of torque 390(*a-n*) to the remaining wheels with decreased wheel speed thereby focuses the electric power on the wheel that is positioned to assist the electric delivery truck 110 to drive forward along the terrain. The operation parameter controller 305 may then continuously determine the wheel with the decreased wheel speed and adjust the percentage of torque 390(*a-n*) of each wheel accordingly as discussed above as the electric delivery truck 110 maneuvers along the terrain.

The operation parameter controller 305 may determine to automatically adjust the torque level applied by each hub motor 330(*a-n*) to each corresponding wheel based on the terrain such that the operation parameter controller 305 may automatically shift the electric delivery truck 110 from two-wheel drive and four-wheel drive depending on the terrain. The operation parameter controller 305 may monitor the hub motor parameters to determine the terrain that the electric delivery truck 110 is operating and then automatically adjust the torque level applied by each hub motor 330(*a-n*) to each corresponding wheel to automatically shift the electric delivery truck 110 from operating in two-wheel drive and four-wheel drive based on the terrain. Conventional electric vehicles require intervention by the driver in which the driver requests that the conventional electric vehicle shift from two-wheel drive and four-wheel drive based on the observation of the driver that the conventional electric vehicle requires a shift from two-wheel drive and four-wheel drive. Such lack of an automatic shift between two-wheel drive and four-wheel drive based on the terrain decreases the performance of the conventional electric vehicle in handling the terrain.

Rather, the operation parameter controller 305 may determine that the electric delivery truck 110 should transition from two-wheel drive to four-wheel drive based on the hub motor parameters and in response to the terrain. The electric delivery truck 110 may continuously shift from two-wheel drive to four-wheel drive based on the torque level applied by each hub motor 330(*a-n*) to each corresponding wheel in reaction to each wheel encountering the terrain. The operation parameter controller 305 may automatically increase the torque level applied by the hub motors 330(*a-n*) to the rear wheels in addition to the torque level applied by the hub motors 330(*a-n*) to the front wheels when the operation parameter controller 305 determines that the hub motor parameters and the terrain require that each of the hub motors 330(*a-n*) apply increased torque levels to each of the wheels such that the electric delivery truck 110 operates in four-wheel drive. The operation parameter controller 305 may then automatically decrease the torque level applied by the hub motors 330(*a-n*) to the rear wheels or the front wheels when the operation parameter controller 350 determines that the hub motor parameters and the terrain no longer require each of the hub motors 330(*a-n*) apply increased torque levels to each of the wheels. The operation parameter controller 305 may determine that the electric delivery truck 110 may sufficiently operate in two-wheel drive to adequately maneuver along the terrain. Rather than have unnecessary electric power consumed by each of the hub motors 330(*a-n*) apply increased torque levels to each of the wheels, the operation parameter controller 305 may decrease the torque level applied by the hub motors 330(*a-n*) to the rear wheels and may rather simply have the torque level applied by the hub motors 330(*a-n*) to the front wheels thereby automatically transitioning the electric deliver truck from operating in four-wheel drive to two-wheel drive based on the terrain.

For example, the operation parameter controller 305 may determine that the electric delivery truck 110 is maneuvering along an off-road terrain with numerous bumps and holes resulting in a differentiation in the level of ground that each wheel is operating which is constantly changing as the electric delivery truck 110 operates. The operation parameter controller 305 may also determine that the electric delivery truck 110 is maneuvering along an increased incline in addition to the off-road terrain. As the electric delivery truck 110 maneuvers along the increased incline of the off-road terrain, the operation parameter controller 305 may determine that the front wheels are slipping despite the hub motors 330(*a-n*) applying increased torque level to the front wheels based on the inclinometer 325.

In order to counteract the terrain, the operation parameter controller 305 may automatically increase the torque levels applied by the hub motors 330(*a-n*) to the rear wheels as well as the front wheels thereby shifting the electric delivery truck 110 from operating in two-wheel drive to four-wheel drive in response to the terrain. As the electric deliver truck 110 approaches a level ground with no incline as well as no bumps and holes, the operation parameter controller 305 may then automatically determine that increased torque levels applied by the hub motors 330(*a-n*) to the rear wheels is no longer necessary for the electric delivery truck 110 to maneuver along the terrain based on the inclinometer 325. In doing so, the operation parameter controller 305 may automatically decrease the torque levels applied by the hub motors 330(*a-n*) to the rear wheels while maintaining the torque levels applied by the hub motors 330(*a-n*) to the front wheels thereby automatically shifting the electric delivery truck 110 from operating in four-wheel drive to two-wheel drive based on the terrain.

In order to counteract the terrain, the operation parameter controller 305 may also automatically transition the electric delivery truck 110 from operating in two-wheel drive and/or four-wheel drive to operating in manual. Based on the hub motor parameters as well as the terrain, the operation parameter controller 305 may determine that automatically transitioning to operating in manual provides increased performance to the operation of the electric delivery truck as compared to operating in two-wheel drive and/or four wheel drive. For example, the electric delivery truck 110 may be executing a route in a densely populated urban area and/or neighborhood in which the streets have decreased width as well as significant changes in incline and/or decline with an increased difficulty in maneuverability. In such an environment, the operation parameter controller 305 may determine that the intelligence level of the driver is required to shift gears of the electric delivery truck 110 without automatic transitioning between two-wheel drive and/or four-wheel drive until the electric delivery truck 110 is no longer operating within such a difficult environment. As a result, the operation parameter controller 305 may automatically switch the electric delivery truck 110 to operate in manual until the electric delivery truck 110 is no longer operating in the difficult environment and may then automatically transition from manual to two-wheel drive and/or four-wheel drive after electric delivery truck 110 departs the difficult environment.

The operation parameter controller 305 may also identify the posted speed limit signs that are positioned along the segment of the roadway as well as any changes in the posted speed limit of the posted speed limit signs. A significant operation parameter for the segment of the roadway is the posted speed limit for the segment of the roadway. The operation parameter controller 305 may monitor the posted speed limit for the segment of the roadway. As the position of the electric delivery truck 110 changes in real-time, the operation parameter controller 305 may capture the posted speed limit signs as the electric delivery truck 110 approaches each posted speed limit sign and thereby determine the current speed limit for the segment of the roadway that the electric delivery truck 110 is currently operating based on the posted speed limit sign captured by the imaging device 340.

The operation parameter controller 305 may then automatically adjust the torque level applied by each hub motor 330(*a-n*) to each corresponding wheel based on the current speed limit for the segment of the roadway that the electric delivery truck 110 is currently operating. The operation parameter controller 305 may ensure that the current speed that the electric delivery truck 110 is operating does not exceed the current speed limit for the segment of the roadway that the electric delivery truck 110 is currently operating based on the torque level applied by each hub motor 330(*a-n*). In doing so, the electric delivery truck 110 may ensure that the driver does not exceed the current speed limit for the segment of the roadway that the electric delivery truck 110 is currently operating. As a result, the MPGe of the electric delivery truck 110 is increased by preventing the driver from unnecessarily increasing the speed beyond the current speed limit of the segment of the roadway in which the electric delivery truck 110 is currently operating thereby increasing the MPGe of the electric delivery truck 110.

The operation parameter controller 305 may then determine any change in the posted speed limit signs. The operation parameter controller 305 may then automatically adjust the speed of the electric delivery truck 110 by automatically adjusting the torque level applied by each hub motor 330(*a-n*) to ensure that the speed of the electric delivery truck 110 does not increase above the change in the speed limit of the segment of the roadway that the electric delivery truck 110 is currently operating as provided by the change in the posted speed limit sign. In doing so, the driver is continuously prevented from exceeding the current speed of the segment of the roadway that the electric delivery truck 110 is currently operating thereby increasing the MPGe of the electric delivery truck 110.

In addition to the operation parameters provided by the CAN bus, the operation parameter controller 305 may also monitor GPS data as the electric delivery truck 110 operates in executing the route. The operation parameter controller 305 may detect the GPS position of the electric delivery truck 110 as the electric delivery truck 110 maneuvers along the roadway relative to the roadway and the driving environment of the electric delivery truck 110. As the position of the electric delivery truck 110 changes in real-time, the GPS position may provide the operation parameter of the position of the electric delivery tuck 110 to the operation parameter controller 305.

In doing so, the operation parameter controller 305 may automatically adjust torque level applied by each hub motor 330(*a-n*) based on the position of the electric delivery truck 110 in real-time relative to the driving environment of the electric delivery truck 110. The operation parameter controller 305 may localize the position of the electric delivery truck 110 relative to the driving environment of the electric delivery truck 110 via the GPS position such that the operation parameter controller 305 may incorporate the localized position of the electric delivery truck 110 into adjusting the torque level applied by each hub motor 330 (*a-n*).

The operation parameter controller 305 may continuously stream 3D maps of the driving environment based on position of the electric delivery truck 110 as detected by the GPS. The operation parameter controller 305 may then incorporate the position of the electric delivery truck 110 as detected by the GPS into the 3D maps of the driving environment and then analyze the 3D maps as the position of the electric delivery truck 110 changes in real-time relative to the driving environment as depicted in the 3D maps. The 3D maps may provide numerous operation parameters that have terrain aspects of the driving environment in that the terrain aspects include characteristics of the driving environment that are associated with the geometry of the segment of the roadway as well as other aspects of the terrain surrounding the electric delivery truck 110 as the electric delivery truck 110 maneuvers along the segment of the roadway. Such terrain aspects may provide the operation parameter controller 305 with the insight as to the aspects associated with the geometry of the driving environment as well as other aspects of the terrain of the driving environment as the electric delivery truck 110 maneuvers along the segment of the roadway in real-time.

For example, the operation parameter controller 305 may also identify the current speed limit of the segment of the roadway that the electric delivery truck 110 is currently operating as provided by the 3D maps as well as any changes in the posted speed limit provided by the 3D maps. As the position of the electric delivery truck 110 changes in real-time, the 3D maps may provide the position of the electric delivery truck 110 in real-time based on the position detected by the GPS. The operation parameter controller 305 may then determine the current speed limit of the segment of the roadway that the electric delivery truck 110 is currently operating based on the position of the electric delivery truck 110 depicted in the 3D maps and the corresponding speed limit provided by the 3D maps and thereby provide the current speed limit of the segment of the roadway that the electric delivery truck 110 is currently operating from the speed limit signs that are provided by the 3D maps.

The operation parameter controller 305 may then automatically adjust the torque level applied by each hub motor 330(*a-n*) based on the current speed limit for the segment of the roadway that the electric delivery truck 110 is currently operating as provided by the 3D maps. The operation parameter controller 305 may ensure that the current speed that the electric delivery truck 110 is operating does not exceed the current speed limit for the segment of the roadway that the electric delivery truck 110 is currently operating. In doing so, the electric delivery truck 110 may ensure that the driver does not exceed the current speed limit for the segment of the roadway that the electric delivery truck 110 is currently operating. As a result, the MPGe of the electric delivery truck 110 is increased by preventing the driver from unnecessarily increasing the speed beyond the current speed limit of the segment of the roadway in which the electric delivery truck 110 is currently operating thereby increasing the MPGe of the electric delivery truck 110.

The 3D maps may then provide the operation parameter controller 305 with any change in the speed limits. The operation parameter controller 305 may then automatically adjust the torque level applied by each hub motor 330(*a-n*) to automatically adjust the speed of the electric delivery truck 110 to ensure that the speed of the electric delivery truck 110 does not increase above the change in the speed limit of the segment of the roadway that the electric delivery truck 110 is currently operating as provided by the 3D maps. In doing so, the driver is continuously prevented from exceeding the current speed of the segment of the roadway that the electric delivery truck 110 is currently operating thereby increasing the MPGe of the electric delivery truck 110.

The GPS may provide numerous operation parameters that have terrain aspects of the driving environment in that the terrain aspects include characteristics of the driving environment that are associated with the geometry of the roadway as well as other aspects of the terrain surrounding the electric delivery truck 110 as the electric delivery truck 110 maneuvers along the roadway. Such terrain aspects may provide the operation parameter controller 305 with the insight as to the aspects associated with the geometry of the driving environment as well as other aspects of the terrain of the driving environment as the electric delivery truck 110 maneuvers along the roadway in real-time.

For example, the GPS in real-time may provide driving parameters such as but not limited to ascending grades of the roadway, descending grades of the roadway, curvature of the roadway, terrain of the roadway, and/or any other type of operation parameter that is associated with the geometry and/or terrain of the segment of the roadway as the electric delivery truck 110 operates in the driving environment that will be apparent to those skilled in the relevant art(s) without departing from the spirit and scope of the disclosure. The operation parameter controller 305 may then incorporate the operation parameters provided by the GPS in real-time to adjust the torque level applied by each of the hub motors 330(*a-n*) in real-time based on the geometry and/or terrain of the roadway as identified by the operation parameters provided by the GPS.

As discussed in detail above, the operation parameter controller 305 may incorporate the operation parameters associated with the geometry and/or terrain of the roadway to automatically adjust the torque level applied by each of the hub motors 330(*a-n*) based on the geometry and/or terrain of the roadway. The geometry and/or terrain of the roadway as determined from the GPS by the operation parameter controller 305 may have a significant impact as to how the operation parameter controller 305 adjusts the operation of the electric delivery truck 110 to accommodate for the geometry and/or terrain of the roadway. In doing so, the operation parameter controller 305 may determine the necessary operation parameters associated with the geometry and/or terrain of the roadway as determined from the GPS to adjust the torque level applied by each hub motor 330(*a-n*) as the geometry and/or terrain of the segment of the roadway changes in real-time. The GPS may provide any type of operation parameter to the operation parameter controller 305 that may enable the operation parameter controller 305 to automatically adjust the operation of the electric delivery truck 110 to account for the impact of the operation parameters provided by the GPS that will be apparent to those skilled in the relevant art(s) without departing from the spirit and scope of the disclosure.

The operation parameter controller 305 may also monitor numerous operation parameters associated with the CAN bus of the electric delivery truck 110. The CAN bus may be receiving numerous signals triggered by numerous components and/or sensors associated with the electric delivery truck 110 as the electric delivery truck 110 maneuvers along the roadway. The operation parameter controller 305 may monitor the numerous operation parameters associated with the CAN bus and then automatically adjust the torque level applied by each of the hub motors 330(*a-n*) based on the numerous operation parameters associated with the CAN bus.

The operation parameter controller 305 and the EV-ECU 385 may be individual computing devices. The operation parameter controller 305 and the EV-ECU 385 may be the same computing device. The operation parameter controller 305 and the EV-ECU may be any combination and/or any quantity individual computing devices that will be apparent to those skilled in the relevant art(s) without departing from the spirit and scope of the disclosure.

The operation parameter controller 305 may be a device that is capable of electronically communicating with other devices. Examples of the operation parameter controller 305 may include a mobile telephone, a smartphone, a workstation, a portable computing device, other computing devices such as a laptop, or a desktop computer, cluster of computers, set-top box, and/or any other suitable electronic device that will be apparent to those skilled in the relevant art(s) without departing from the spirit and scope of the disclosure.

In an embodiment, multiple modules may be implemented on the same computing device. Such a computing device may include software, firmware, hardware or a combination thereof. Software may include one or more applications on an operating system. Hardware can include, but is not limited to, a processor, a memory, and/or graphical user interface display.

CONCLUSION

It is to be appreciated that the Detailed Description section, and not the Abstract section, is intended to be used to interpret the claims. The Abstract section may set forth one or more, but not all exemplary embodiments, of the present disclosure, and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) the various changes in form and detail can be made without departing from the spirt and scope of the present disclosure. Thus the present disclosure should not be limited by any of the above-described exemplary embodiments, but should be defined only in accordance with the following claims and their equivalents.

What is claimed is:

1. An electric delivery truck control system to automatically manage a plurality of hub motor parameters associated with a plurality of hub motors of an electric delivery truck as the electric delivery truck operates, comprising:
   a plurality of sensors associated with the hub motors of the electric delivery truck that is configured to detect the hub motor parameters associated with the hub motors, wherein the hub motor parameters are indicative to an operation of the hub motors of the electric delivery truck as the electric delivery truck maneuvers on a roadway;
   an electric delivery truck control unit (EV-ECU) associated with the electric delivery truck and comprising a first processor and a first memory having a first plurality of instructions stored therein, that in response to execution by the first processor, causes the EV-ECU to:
      detect a plurality of electric delivery truck control inputs generated from the operation of the electric delivery truck as the electric delivery truck maneuvers along the roadway; and
   an operation parameter controller associated with the electric delivery truck and comprising a second processor and a second memory having a second plurality of instructions stored therein that, in response to execution by the second processor, causes the operation parameter controller to:

automatically adjust a torque level applied by each hub motor of the electric delivery truck to be within a hub motor operation threshold based on the hub motor parameters thereby enabling each hub motor to operate at an operation torque level as requested by the electric delivery truck control inputs from the operation of the electric delivery truck and maintaining the torque level applied by each hub motor within a current limit allowed by a battery management unit of the electric delivery truck and a torque limit allowed by each hub motor as the electric delivery truck executes a route, continuously monitor the hub motor parameters and the operation torque level requested by the electric delivery truck control inputs to maintain the torque level at a percentage of maximum torque within the current limit allowed by the battery management unit and the torque limit allowed by each hub motor as the electric delivery truck operates to execute the route, and continuously adjust the torque level applied by each hub motor of the electric delivery truck to be at the percentage of maximum torque that is continuously adjusted as the hub motor parameters and the requested operation torque level continuously change to maintain the torque level within the percentage of current limit allowed by the battery management unit and the torque limit allowed by each hub motor that continuously change as the electric delivery truck operates to execute the route.

2. The electric delivery truck control system of claim 1, wherein the second memory having the second plurality of instructions that causes the operation parameter controller to:

monitor the hub motor parameters and the operation torque level to determine when an increase in the operation torque level is requested by the electric delivery truck control inputs; and automatically adjust the torque level applied by each hub motor of the electric delivery truck to be at the percentage of maximum torque that maps a step torque level that transitions the increase of the torque level at an increased percentage of the maximum torque to a stepped increase in the torque level over an increased duration of time to satisfy the increase in requested operation torque level and maintains the torque level within the percentage of current limit allowed by the battery management unit and the torque limit allowed by each hub motor that continuously change as the electric delivery truck operates to execute the route.

3. The electric delivery truck control system of claim 2, wherein the second memory having the second plurality of instructions that causes the operation parameter controller to:

monitor the hub motor parameters and the operation torque level to determine when a decrease in the operation torque level is requested by the electric delivery truck control inputs; and automatically adjust the torque level applied by each hub motor of the electric delivery truck to be at the percentage of maximum torque that maps a step torque level that transitions the decrease of the torque level at a decreased percentage of the maximum torque to a stepped decrease in the torque level over an increased duration of time to satisfy the decrease in the requested operation torque level and maintains a charge current generated from the decreased percentage of maximum torque is within the percentage of current limit allowed by the battery management unit for regeneration of an electric battery storage pack of the electric delivery truck that continuously changes as the electric delivery truck executes the route.

4. The electric delivery truck control system of claim 2, wherein the first memory having the first plurality of instructions that causes the EV-ECU to:

detect an acceleration level and a deceleration level generated from the operation of the electric delivery truck as the electric delivery truck operates;

detect a discharge current limit generated from the battery management unit as the electric delivery truck accelerates that limits an amount of current that is allowed to be discharged from an electric battery storage pack associated with the electric delivery truck as the electric delivery truck accelerates; and detect a charge current limit from the battery management unit as the electric delivery truck decelerates that limits an amount of current that is allowed to be charged into the electric battery storage pack associated with the electric delivery truck as the electric delivery truck decelerates.

5. The electric delivery truck control system of claim 4, wherein the second memory having the second plurality of instructions causes the operation parameter controller to:

determine whether at least one hub motor is deactivated and at least one hub motor is activated based on whether the acceleration of the electric delivery truck decreases below an acceleration threshold, wherein the at least one hub motor that is deactivated is not required to drive the electric delivery truck when operation below the acceleration threshold;

automatically activate the at least one hub motor that is deactivated and maintain the activation of the at least one hub motor that is activated when operating below the acceleration threshold to convert energy from kinetic energy from the operation of the electric delivery truck; and store the energy converted from the at least one hub motor that is not required to drive the electric delivery truck when operating below the acceleration threshold from the kinetic energy in the battery management unit of the electric delivery truck.

6. The electric delivery truck control system of claim 4, wherein the second memory having the second plurality of instructions that causes the operation parameter controller to:

convert the acceleration level generated from a position of an acceleration pedal of the electric delivery truck as the electric delivery truck operates from a first voltage value and a second voltage value to an acceleration percentage, wherein the acceleration percentage corresponds to an acceleration range that the electric delivery truck is capable of accelerating and is based on the position of the acceleration pedal;

determine a discharge current provided by the electric battery storage pack that is required to satisfy the acceleration percentage requested by the position of the acceleration pedal and whether the required discharge current is within the discharge current limit of the electric battery storage pack as provided by the battery management unit based on a quantity of hub motors that is required to be activated, wherein the discharge current required to satisfy the acceleration percentage is a function of the quantity of hub motors that is required to be activated to satisfy the acceleration percentage requested by position of the acceleration pedal;

determine whether each hub motor is required to be activated to generate the discharge current that is required to satisfy the acceleration percentage requested by the position of the acceleration pedal, wherein an activation of each hub motor increases the discharge current that is required to satisfy the acceleration percentage requested by the position of the acceleration pedal thereby increasing an acceleration of the electric delivery truck as requested by the driver;

activate each selected hub motor that is determined as required to be activated to generate the discharge current required to generate the discharge current to satisfy the acceleration percentage, wherein each hub motor that is not selected to be activated is not required to be activated to generate the discharge current required to satisfy the acceleration percentage;

continuously adjust the torque level applied by each activated hub motor of the electric delivery truck to be at the percentage of maximum torque that satisfies the acceleration percentage requested by the position of the acceleration pedal when the required discharge current is within the discharge current limit of the electric battery storage pack; and limit the torque level applied by each activated hub motor of the electric delivery truck to be at a decreased percentage of maximum torque that fails to satisfy the acceleration percentage requested by the position of the acceleration pedal when the required discharge current is above the discharge current limit of the electric battery storage pack, wherein the decreased percentage of maximum torque is the percentage of maximum torque that provides a decreased acceleration percentage that is decreased from the acceleration percentage requested by the position of the acceleration pedal and enables the requested discharge current that corresponds to the decreased acceleration percentage to be within the discharge current limit of the electric battery storage pack.

7. The electric delivery truck control system of claim 6, wherein the second memory having the second plurality of instructions that causes the operation parameter controller to:

monitor the acceleration percentage requested by the position of the acceleration pedal and the discharge current limit of the electric battery storage pack as provided by the battery management unit at periodic intervals as the electric delivery truck accelerates;

determine at each periodic interval whether the discharge current required to satisfy the acceleration percentage requested by the position of the acceleration pedal is within the discharge current limit of the electric battery storage pack as provided by the battery management unit at each periodic interval; and automatically adjust the torque level applied by each hub motor of the electric delivery truck to be at the percentage of maximum torque that maps a corresponding step torque level at each periodic interval that transitions the increase of the torque level at an increased percentage of the maximum torque to a stepped increase in the torque level at each periodic interval to satisfy the increase in requested operation torque level as requested by the position of the acceleration pedal and maintains the required discharge current within the discharge current limit of the electric battery storage pack.

8. The electric delivery truck control system of claim 4, wherein the second memory having the second plurality of instructions that causes the operation parameter controller to:

convert the deceleration level generated from a position of an acceleration pedal of the electric delivery truck as the electric delivery truck operates from a first voltage value and a second voltage value to a deceleration percentage, wherein the deceleration percentage corresponds to a deceleration range that the electric delivery truck is capable of decelerating and is based on the position of the acceleration pedal;

determine a charge current provided by the electric battery storage pack to enable the electric battery storage pack to be charged based on the deceleration percentage requested by the position of the acceleration pedal and whether the charge current that is to be generated with the deceleration percentage is within the charge current limit of the electric battery storage pack for regeneration as provided by the battery management unit based on a first quantity of hub motors that is required to be activated to drive the electric delivery truck and a second quantity of hub motors that is required to be transitioned into a regeneration mode, wherein the charge current required to enable the electric battery storage pack to be charged based on the deceleration percentage is a function of the first quantity of hub motors that is required to be activated to satisfy the deceleration percentage required by the position of the acceleration pedal and the second quantity of hub motors that is required to be transitioned into the regeneration mode to enable the electric battery storage pack to be charged based on the deceleration percentage; and activate each selected hub motor from the first quantity of hub motors that is determined as required to be activated to drive the electric delivery truck to satisfy the deceleration percentage required by the position of the acceleration pedal;

transition each selected hub motor from the second quantity of hub motors into the regeneration mode that is determined to generate the charge current to enable the electric battery storage pack to be charged based on the deceleration percentage requested by the position of the acceleration pedal, wherein each hub motor that transitioned into the regeneration mode is not required to be activated to drive the electric delivery truck to satisfy the deceleration percentage required by the position of the acceleration pedal;

continuously adjust the torque level applied by each hub motor of the electric delivery truck to be at the percentage of maximum torque that satisfies the deceleration percentage requested by the position of the acceleration pedal; and continuously adjust the charge current generated from the decrease in the percentage of maximum torque that is provided to the electric battery storage pack for regeneration to be within the current limit of the electric battery storage pack, wherein the charge current generated from the decrease in the percentage of maximum torque that is provided to the electric battery storage pack for regeneration is decreased when the charge current exceeds the current limit of the electric battery storage pack.

9. The electric delivery truck control system of claim 8, wherein the second memory having the second plurality of instructions that causes the operation parameter controller to:
monitor the deceleration percentage requested by the position of the acceleration pedal and the charge current limit of the electric battery storage pack as provided by the battery management unit at periodic intervals as the electric delivery truck decelerates;
determine at each periodic interval whether the charge current generated from the deceleration percentage requested by the position of the acceleration pedal is within the current limit for regeneration of the electric battery storage pack as provided by the battery management unit at each periodic interval; and
automatically adjust the torque level applied by each hub motor of the electric delivery truck to be at the percentage of maximum torque that maps a corresponding step torque level at each periodic interval that transitions the decrease of the torque level at a decreased percentage of the maximum torque to a stepped decrease in the torque level at each periodic interval to satisfy the decrease in requested operation torque level as requested by the position of the acceleration pedal and maintains the charge current generated from the deceleration percentage that is allowed to regenerate the electric battery storage pack to be within the charge current limit of the electric battery storage pack.

10. A method for automatically managing a plurality of hub motor parameters associated with a plurality of hub motors of an electric delivery truck as the electric delivery truck operates, comprising:
detecting the hub motor parameters associated with the hub motors, wherein the hub motor parameters are indicative to an operation of the hub motors of the electric delivery truck as the electric delivery truck maneuvers on a roadway;
detecting a plurality of electric delivery truck control inputs generated from the operation of the electric delivery truck as the electric delivery truck maneuvers along the roadway; and
automatically adjusting a torque level applied by each hub motor of the electric delivery truck to be within a hub motor operation threshold based on the hub motor parameters thereby enabling each hub motor to operate at an operation torque level as requested by the electric delivery truck control inputs from the operation of the electric delivery truck and maintaining the torque level applied by each hub motor within a current limit allowed by a battery management unit of the electric delivery truck and a torque limit allowed by each hub motor as the electric delivery truck executes a route;
continuously monitoring the hub motor parameters and the operation torque level requested by the electric delivery truck control inputs to maintain the torque level at a percentage of maximum torque within the current limit allowed by the battery management unit and the torque limit allowed by each hub motor as the electric delivery truck operates to execute the route; and
continuously adjusting the torque level applied by each hub motor of the electric delivery truck to be at the percentage of maximum torque that is continuously adjusted as the hub motor parameters and the requested operation torque level continuously change to maintain the torque level within the percentage of current limit allowed by the battery management unit and the torque limit allowed by each hub motor that continuously change as the electric delivery truck operates to execute the route.

11. The method of claim 10, further comprising:
monitoring the hub motor parameters and the operation torque level to determine when an increase in the operation torque level is requested by the electric delivery truck control inputs; and
automatically adjusting the torque level applied by each hub motor of the electric delivery truck to be at the percentage of maximum torque that maps a step torque level that transitions the increase of the torque level at an increased percentage of the maximum torque to a stepped increase in the torque level over an increased duration of time to satisfy the increase in requested operation torque level and maintains the torque level within the percentage of current limit allowed by the battery management unit and the torque limit allowed by each hub motor that continuously change as the electric delivery truck operates to execute the route.

12. The method of claim 11, further comprising:
monitoring the hub motor parameters and the operation torque level to determine when a decrease in the operation torque level is requested by the electric deliver truck control inputs; and
automatically adjusting the torque level applied by each hub motor of the electric delivery truck to be at the percentage of maximum torque that maps a step torque level that transitions the decrease of the torque level at a decreased percentage of the maximum torque to a stepped decrease in the torque level over an increased duration of time to satisfy the decrease in the requested operation torque level and maintains a charge current generated from the decreased percentage of maximum torque is within the percentage of current limit allowed by the battery management unit for regeneration of a drive battery of the electric delivery truck that continuously changes as the electric delivery truck operates to execute the route.

13. The method of claim 11, wherein the continuously monitoring comprises:
detecting an acceleration level and a deceleration level generated from the operation of the electric delivery truck as the electric delivery truck operates;
detecting a discharge current limit generated from the battery management unit as the electric delivery truck accelerates that limits an amount of current that is allowed to be discharged from a drive battery associated with the electric delivery truck as the electric delivery truck accelerates; and
detecting a charge current limit from the battery management unit as the electric delivery truck decelerates that limits an amount of current that is allowed to be charged into the drive battery associated with the electric delivery truck as the electric delivery truck decelerates.

14. The method of claim 13, further comprising:
determining whether at least one hub motor is deactivated and at least one hub motor is activated based on whether the acceleration of the electric delivery truck decreases below an acceleration threshold, wherein the at least one hub motor that is deactivated is not required to drive the electric delivery truck when operating below the acceleration threshold;
automatically activating the at least one hub motor that is deactivated and maintaining the activation of the at least one hub motor that is activated when operating below the acceleration threshold to convert energy from kinetic energy from the operation of the electric delivery truck; and storing the energy converted from the at least one hub motor that is not required to drive the electric delivery truck when operating below the acceleration threshold from the kinetic energy in the battery management unit of the electric delivery truck.

15. The method of claim 13, further comprising:

converting the acceleration level generated from a position of an acceleration pedal of the electric delivery truck as the electric delivery truck operates from a first voltage value and a second voltage value to an acceleration percentage, wherein the acceleration percentage corresponds to an acceleration range that the electric delivery truck is capable of accelerating and is based on the position of the acceleration pedal;

determining a discharge current provided by the drive battery that is required to satisfy the acceleration percentage requested by the position of the acceleration pedal and whether the required discharge current is within the discharge current limit of the drive battery as provided by the battery management unit based on a quantity of hub motors that is required to be activated, wherein the discharge current required to satisfy the acceleration percentage is a function of the quantity of hub motors that is required to be activated to satisfy the acceleration percentage requested by the position of the acceleration pedal; and determining whether each hub motor is required to be activated to generate the discharge current that is required to satisfy the acceleration percentage requested by the position of the acceleration pedal, wherein an activation of each hub motors increases the discharge current that is required to satisfy the acceleration percentage requested by the position of the acceleration pedal thereby increasing an acceleration of the electric delivery truck as requested by the driver;

activating each selected hub motor that is determined as required to be activated to generate the discharge current required to generate the discharge current to satisfy the acceleration percentage, wherein each hub motor that is not selected to be activated is not required to be activated to generate the discharge current required to satisfy the acceleration percentage;

continuously adjusting the torque level applied by each hub motor of the electric delivery truck to be at the percentage of maximum torque that satisfies the acceleration percentage requested by the position of the acceleration pedal when the required discharge current is within the discharge current limit of the drive battery; and limiting the torque level applied by each hub motor of the electric delivery truck to be at a decreased percentage of maximum torque that fails to satisfy the acceleration percentage requested by the position of the acceleration pedal when the required discharge current is above the discharge current limit of the drive battery, wherein the decreased percentage of maximum torque is the percentage of maximum torque that provides a decreased acceleration percentage that is decreased from the acceleration percentage requested by the position of the acceleration pedal and enables the requested discharge current that corresponds to the decreased acceleration percentage to be within the discharge current limit of the drive battery.

16. The method of claim 15, further comprising:

monitoring the acceleration percentage requested by the position of the acceleration pedal and the discharge current limit of the drive battery as provided by the battery management unit at periodic intervals as the electric delivery truck accelerates;

determining at each periodic interval whether the discharge current required to satisfy the acceleration percentage requested by the position of the acceleration pedal is within the discharge current limit of the drive battery as provided by the battery management unit at each periodic interval; and automatically adjusting the torque level applied by each hub motor of the electric delivery truck to be at the percentage of maximum torque that maps a corresponding step torque level at each periodic interval that transitions the increase of the torque level at an increased percentage of the maximum torque to a stepped increase in the torque level at each periodic interval to satisfy the increase in requested operation torque level as requested by the position of the acceleration pedal and maintains the required discharge current within the discharge current limit of the drive battery.

17. The method of claim 13, further comprising:

converting the deceleration level generated from a position of an acceleration pedal of the electric delivery truck as the electric delivery truck operates from a first voltage value and a second voltage value to a deceleration percentage, wherein the deceleration percentage corresponds to a deceleration range that the electric delivery truck is capable of decelerating and is based on the position of the acceleration pedal;

determining a charge current provided by the electric battery storage pack to enable the electric battery storage pack to be charged based on the deceleration percentage requested by the position of the acceleration pedal and whether the charge current that is to be generated with the deceleration percentage is within the charge current limit of the electric battery storage pack for regeneration as provided by the battery management unit based on a first quantity of hub motors that is required to be activated to drive the electric delivery truck and a second quantity of hub motors that is required to be transitioned into a regeneration mode, wherein the charge current required to enable the electric battery storage pack to be charged based on the deceleration percentage is a function of the first quantity of hub motors that is required to be activated to satisfy the deceleration percentage required by the position of the acceleration pedal and the second quantity of hub motors that is required to be transitioned into the regeneration mode to enable the electric battery storage pack to be charged based on the deceleration percentage;

activating each selected hub motor from the first quantity of hub motors that is determined as required to be activated to drive the electric delivery truck to satisfy the deceleration percentage required by the position of the acceleration pedal;

transitioning each selected hub motor from the second quantity of hub motors into the regeneration mode that is determined to generate the charge current to enable the electric battery storage pack to be charged based on the deceleration percentage requested by the position of the acceleration pedal, wherein each hub motor that transitioned into the regeneration mode is not required to be activated to drive the electric delivery truck to satisfy the deceleration percentage required by the position of the acceleration pedal;

continuously adjusting the torque level applied by each hub motor of the electric delivery truck to be at the percentage of maximum torque that satisfies the deceleration percentage requested by the position of the acceleration pedal; and continuously adjusting the charge current generated from the decrease in the percentage of maximum torque that is provided to the drive battery for regeneration to be within the current limit of the drive battery, wherein the charge current generated from the decrease in the percentage of maximum torque that is provided to the drive battery for regeneration is decreased when the charge current exceeds the current limit of the drive battery.

18. The method of claim 17, further comprising:

monitoring the deceleration percentage requested by the position of the acceleration pedal and the charge current limit of the drive battery as provided by the battery management unit at periodic intervals as the electric delivery truck decelerates;

determining at each periodic interval whether the charge current generated from the deceleration percentage requested by the position of the acceleration pedal is within the current limit for regeneration of the drive battery as provided by the battery management unit at each periodic interval; and automatically adjusting the torque level applied by each hub motor of the electric delivery truck to be at the percentage of maximum torque that maps a corresponding step torque level at each periodic interval that transitions the decrease of the torque level at a decreased percentage of the maximum torque to a stepped decrease in the torque level at each periodic interval to satisfy the decrease in requested operation torque level as requested by the position of the acceleration pedal and maintains the charge current generated from the deceleration percentage that is allowed to regenerate the drive battery to be within the charge current limit of the drive battery.

* * * * *